United States Patent
Tokuhara

(10) Patent No.: US 11,230,155 B2
(45) Date of Patent: Jan. 25, 2022

(54) CONTROL APPARATUS FOR SUSPENSION APPARATUS AND SUSPENSION SYSTEM

(71) Applicant: Showa Corporation, Gyoda (JP)

(72) Inventor: Masato Tokuhara, Fukuroi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 140 days.

(21) Appl. No.: 16/670,078

(22) Filed: Oct. 31, 2019

(65) Prior Publication Data

US 2020/0070613 A1   Mar. 5, 2020

Related U.S. Application Data

(63) Continuation of application No. PCT/JP2017/025766, filed on Jul. 14, 2017.

(30) Foreign Application Priority Data

Jul. 7, 2017 (JP) .............................. JP2017-133663

(51) Int. Cl.
  *B60G 17/016* (2006.01)
  *B60W 30/14* (2006.01)
(52) U.S. Cl.
  CPC ....... *B60G 17/0164* (2013.01); *B60W 30/143* (2013.01); *B60G 2400/204* (2013.01); *B60G 2400/252* (2013.01)
(58) Field of Classification Search
  CPC .......... B60G 17/0164; B60G 2400/204; B60G 2400/252; B60G 2600/14;

(Continued)

(56) References Cited

U.S. PATENT DOCUMENTS 5,152,547 A * 10/1992 Davis ................... B60G 17/018
                                                          188/313
5,509,512 A *  4/1996 Grundei ............... B60G 15/063
                                                          188/284

(Continued)

FOREIGN PATENT DOCUMENTS

JP    2004-149090 A    5/2004
JP    2009-255777 A    11/2009

(Continued)

OTHER PUBLICATIONS

International Search Report dated Sep. 19, 2017 for the corresponding International Application No. PCT/JP2017/025766.

*Primary Examiner* — Mussa A Shaawat
(74) *Attorney, Agent, or Firm* — Leason Ellis LLP

(57) ABSTRACT

A control apparatus for a suspension apparatus, includes: a vehicle speed acquiring section which acquires a vehicle speed as a speed of a vehicle; an acquisition section which acquires a stroke velocity of the suspension apparatus; a contribution ratio determining section which determines a contribution ratio between a first parameter and a second parameter based on the vehicle speed, the first parameter serving for controlling a damping force in a first speed region of the vehicle, the second parameter serving for controlling the damping force in a second speed region which is a speed region higher in speed than the first speed region; a change amount restricting section which restricts a change amount of the contribution ratio; and a damping force controlling section which controls the damping force of the suspension apparatus based on the restricted contribution ratio and the stroke velocity.

11 Claims, 17 Drawing Sheets

(58) Field of Classification Search
CPC .......... B60G 2600/172; B60G 2600/11; B60G 2500/11; B60G 17/08; B60G 2300/12; B60G 2202/312; B60G 6015/062; B60G 6017/015; B60W 30/143
See application file for complete search history.

(56) References Cited

U.S. PATENT DOCUMENTS

| | | | | |
|---|---|---|---|---|
| 5,522,482 | A * | 6/1996 | Kashiwagi | B60G 17/015 188/266.4 |
| 5,533,597 | A * | 7/1996 | Nezu | B60G 17/018 188/266.4 |
| 5,701,245 | A * | 12/1997 | Ogawa | B60G 17/0165 280/5.515 |
| 5,781,873 | A * | 7/1998 | Sasaki | B60G 17/018 701/37 |
| 6,067,490 | A * | 5/2000 | Ichimaru | B60G 17/018 188/266.2 |
| 6,314,353 | B1 * | 11/2001 | Ohsaku | B60G 17/018 188/266.1 |
| 7,942,248 | B2 * | 5/2011 | St. Clair | B60N 2/505 188/267.1 |
| 2005/0098401 | A1 * | 5/2005 | Hamilton | F16F 9/466 188/378 |
| 2006/0054434 | A1 * | 3/2006 | Fukuda | F16F 9/465 188/313 |
| 2008/0009992 | A1 * | 1/2008 | Izawa | B60G 17/08 701/37 |
| 2012/0136506 | A1 * | 5/2012 | Takeuchi | B62D 6/007 701/1 |
| 2014/0084528 | A1 * | 3/2014 | Murakami | F16F 9/56 267/221 |
| 2015/0066295 | A1 * | 3/2015 | Kanda | B60G 17/01933 701/38 |
| 2016/0272032 | A1 | 9/2016 | Nedachi | |
| 2016/0272033 | A1 * | 9/2016 | Nedachi | B60G 17/0164 |
| 2017/0307044 | A1 * | 10/2017 | Yamashita | F16F 9/185 |

FOREIGN PATENT DOCUMENTS

| | | |
|---|---|---|
| JP | 2010-167907 A | 8/2010 |
| JP | 2016-107916 A | 6/2016 |
| JP | 2016-175469 A | 10/2016 |
| WO | WO-2013-111742 A1 | 8/2013 |

\* cited by examiner

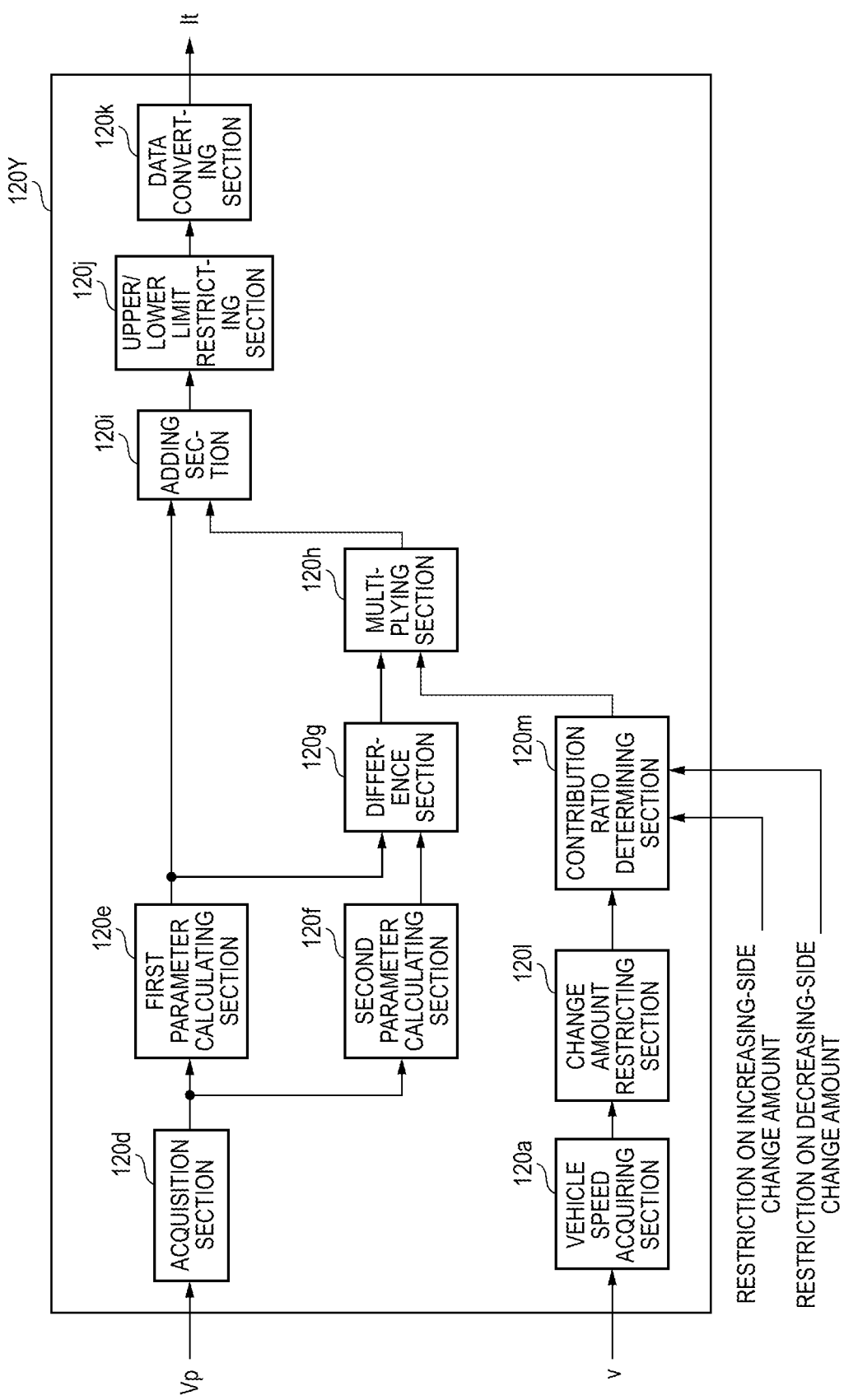

CONTROL APPARATUS FOR SUSPENSION APPARATUS AND SUSPENSION SYSTEM

CROSS-REFERENCE TO RELATED APPLICATION(S)

This application is a continuation of PCT application No. PCT/JP2017/025766 filed on Jul. 14, 2017, which is based upon and claims the benefit of priority to Japanese Patent Application No. 2017-133663 filed on Jul. 7, 2017, the contents of which are incorporated herein by reference.

TECHNICAL FIELD

The present invention relates to a control apparatus for a suspension apparatus and a suspension system.

BACKGROUND ART

Vehicles such as motorcycles are provided with suspension apparatuses (suspensions) for suitably reducing vibration transmitted from road surfaces toward vehicle bodies during travelling to thereby improve ride comfortability or steering stability. Recently, so-called electronic control suspensions which can electronically control damping forces of such suspension apparatuses are gaining popularity.

A suspension apparatus for a vehicle has been described in PTL 1. The suspension apparatus is configured to allow working oil of each of paired hydraulic cylinders for suspension of a vehicle body to flow into a first oil chamber and a second oil chamber of a pressure regulating apparatus. The two oil chambers are made communicable with each other through a variably additional damping force valve. The suspension apparatus is provided with a control section which controls the variably additional damping force valve. The control section can change over an additional damping force characteristic from one of two or more stages to another. A desired additional damping force characteristic can be selected by an operation from the outside. When a vehicle speed becomes not lower than a predetermined forcible changeover vehicle speed in a state in which the selected additional damping force characteristic is an additional damping force characteristic with a relatively small damping force, the control section controls the variably additional damping force valve to forcibly change over the additional damping force characteristic to an additional damping force characteristic with a relatively large damping force.

A control apparatus of a suspension apparatus has been described in PTL 2. The control apparatus is provided with a control section which electrically controls a damping force characteristic of a damping mechanism of the suspension apparatus damping at least one of an extension direction force and a compression direction force when a wheel and a vehicle body move relatively to each other, and which can change over the damping force characteristic from one of a plurality of characteristic modes to another. The control section is configured to change a changeover time required for changeover from one to another among the characteristic modes, in accordance with the magnitude of a change of the damping force for the changeover among the characteristic modes. In PTL 2, an ECU of a motorcycle is described as the control apparatus of the suspension apparatus, and a right side front fork and a rear suspension are described as the suspension apparatus. In addition, a compression-side electronic control valve, an extension-side electronic control valve, a compression-side electronic control valve and an extension-side electronic control valve are described as the damping mechanism, and a circuit mode, a sports mode, a normal mode and a comfort mode are described as the characteristic modes.

PTL 1: JP-A-2004-149090
PTL 2: JP-A-2009-255777

In order to control the damping force of the suspension apparatus, a current value determined based on a stroke velocity may be varied. In addition, a requirement characteristic required in a low speed-side speed region of a vehicle speed varies from a requirement characteristic required in a high speed-side speed region of the vehicle speed. Therefore, vehicle speed-dependent control for outputting different current values respectively for the low speed-side speed region and the high speed-side speed region may have to be performed. Further, in order to lower an influence on a driver when the current value is changed over from one of the different current values to the other between the low speed-side speed region and the high speed-side speed region, a transition region may be provided between the low speed-side speed region and the high speed-side speed region so that the current value can be changed over more smoothly.

However, when, for example, acceleration or deceleration of the vehicle is large, the current value has a more sudden change between the low speed-side speed region and the high speed-side speed region. Therefore, the influence on the driver increases. As a result, the driver is more apt to feel uncomfortable feeling. In order to suppress this, it is considered that countermeasures may be taken to widen a speed range of the transition region or to reduce the difference between the current values outputted in the low speed-side speed region and the high speed-side speed region. However, when these countermeasures are taken, there is a problem that an effect of the vehicle speed-dependent control is lowered.

An object of the present invention is to provide a control apparatus for a suspension apparatus etc., by which an influence on a driver can be reduced easily even during large acceleration or deceleration of a vehicle while an effect of vehicle speed-dependent control is maintained.

SUMMARY OF INVENTION

According to an aspect of the present invention which has been completed for achievement of the foregoing object, there is provided a control apparatus for a suspension apparatus, including: a vehicle speed acquiring section which acquires a vehicle speed as a speed of a vehicle; an acquisition section which acquires a stroke velocity of the suspension apparatus disposed between a vehicle body and a wheel to damp vibration propagated from the wheel; a contribution ratio determining section which determines a contribution ratio between a first parameter and a second parameter based on the vehicle speed, the first parameter serving for controlling a damping force in a first speed region of the vehicle, the second parameter serving for controlling the damping force in a second speed region which is a speed region higher in speed than the first speed region; a change amount restricting section which restricts a change amount of the contribution ratio; and a damping force controlling section which controls the damping force of the suspension apparatus based on the restricted contribution ratio and the stroke velocity.

According to another aspect of the present invention, there is provided a control apparatus for a suspension apparatus, including: a vehicle speed acquiring section which acquires a vehicle speed as a speed of a vehicle; an acquisition section which acquires a stroke velocity of the suspension apparatus disposed between a vehicle body and a wheel to damp vibration propagated from the wheel; a change amount restricting section which restricts a change amount of the vehicle speed; a contribution ratio determining section which determines a contribution ratio between a first parameter and a second parameter based on the restricted vehicle speed, the first parameter serving for controlling a damping force in a first speed region of the vehicle, the second parameter serving for controlling the damping force in a second speed region which is a speed region higher in speed than the first speed region; and a damping force controlling section which controls the damping force of the suspension apparatus based on the determined contribution ratio and the stroke velocity.

Moreover, the above aspect of the present invention may be configured so that a transition region is provided between the first speed region and the second speed region; and the change amount restricting section restricts the change amount of the vehicle speed in a speed range of the transition region.

Further, the aspect of the present invention may be configured so that the contribution ratio determining section determines the contribution ratio in a transition region between the first speed region and the second speed region.

Further, the aspect of the present invention may be configured so that the damping force controlling section includes: a multiplying section which multiplies a difference between the first parameter and the second parameter by the contribution ratio to thereby obtain a multiplication value; and an adding section which adds the multiplication value to the first parameter to thereby calculate an addition value which is a current value determined by the stroke velocity in order to control the damping force of the suspension apparatus; and the damping force controlling section controls the damping force of the suspension apparatus by use of the addition value.

Further, the aspect of the present invention may be configured so that the change amount restricting section restricts a change amount of the contribution ratio when the vehicle speed decreases.

According to another aspect of the present invention, there is provided a suspension system including: a suspension apparatus which is disposed between a vehicle body and a wheel of a vehicle to damp vibration propagated from the wheel; and a control section which controls a damping force of the suspension apparatus; the control section includes: a vehicle speed acquiring section which acquires a vehicle speed as a speed of the vehicle; an acquisition section which acquires a stroke velocity of the suspension apparatus; a contribution ratio determining section which determines a contribution ratio between a first parameter and a second parameter based on the vehicle speed, the first parameter serving for controlling the damping force in a first speed region of the vehicle, the second parameter serving for controlling the damping force in a second speed region which is a speed region higher in speed than the first speed region; a change amount restricting section which restricts a change amount of the contribution ratio; and a damping force controlling section which controls the damping force of the suspension apparatus based on the restricted contribution ratio and the stroke velocity.

According to another aspect of the present invention, there is provided a suspension system including: a suspension apparatus which is disposed between a vehicle body and a wheel of a vehicle to damp vibration propagated from the wheel; and a control section which controls a damping force of the suspension apparatus; the control section includes: a vehicle speed acquiring section which acquires a vehicle speed as a speed of the vehicle; an acquisition section which acquires a stroke velocity of the suspension apparatus; a change amount restricting section which restricts a change amount of the vehicle speed; a contribution ratio determining section which determines a contribution ratio between a first parameter and a second parameter based on the restricted vehicle speed, the first parameter serving for controlling the damping force in a first speed region of the vehicle, the second parameter serving for controlling the damping force in a second speed region which is a speed region higher in speed than the first speed region; and a damping force controlling section which controls the damping force of the suspension apparatus based on the determined contribution ratio and the stroke velocity.

Moreover, the aspect of the present invention may be configured so that the suspension apparatus includes a stroke sensor which outputs a stroke amount of the suspension apparatus; and the acquisition section calculates the stroke velocity based on the stroke amount outputted by the stroke sensor.

According to the present invention, it is possible to provide a control apparatus for a suspension apparatus, etc., by which an influence on a driver can be reduced easily even during large acceleration or deceleration of a vehicle while an effect of vehicle speed-dependent control is maintained.

BRIEF DESCRIPTION OF THE DRAWINGS

FIG. 7-1 is a view showing an example of maps each showing correspondence between a stroke velocity and a current value.

FIG. 7-2A is a view showing another example of the relation between the first parameter and the second parameter.

FIG. 7-2B is a view showing another example of the relation between the first parameter and the second parameter.

FIG. 7-2C is a view showing another example of the relation between the first parameter and the second parameter.

FIG. 7-2D is a view showing another example of the relation between the first parameter and the second parameter.

FIG. 8 is a block diagram for explaining a functional configuration of a setting section in a second configuration example.

DESCRIPTION OF EMBODIMENT

An embodiment of the present invention will be described below in detail with reference to the accompanying drawings.

(Motorcycle)

Figure 1:
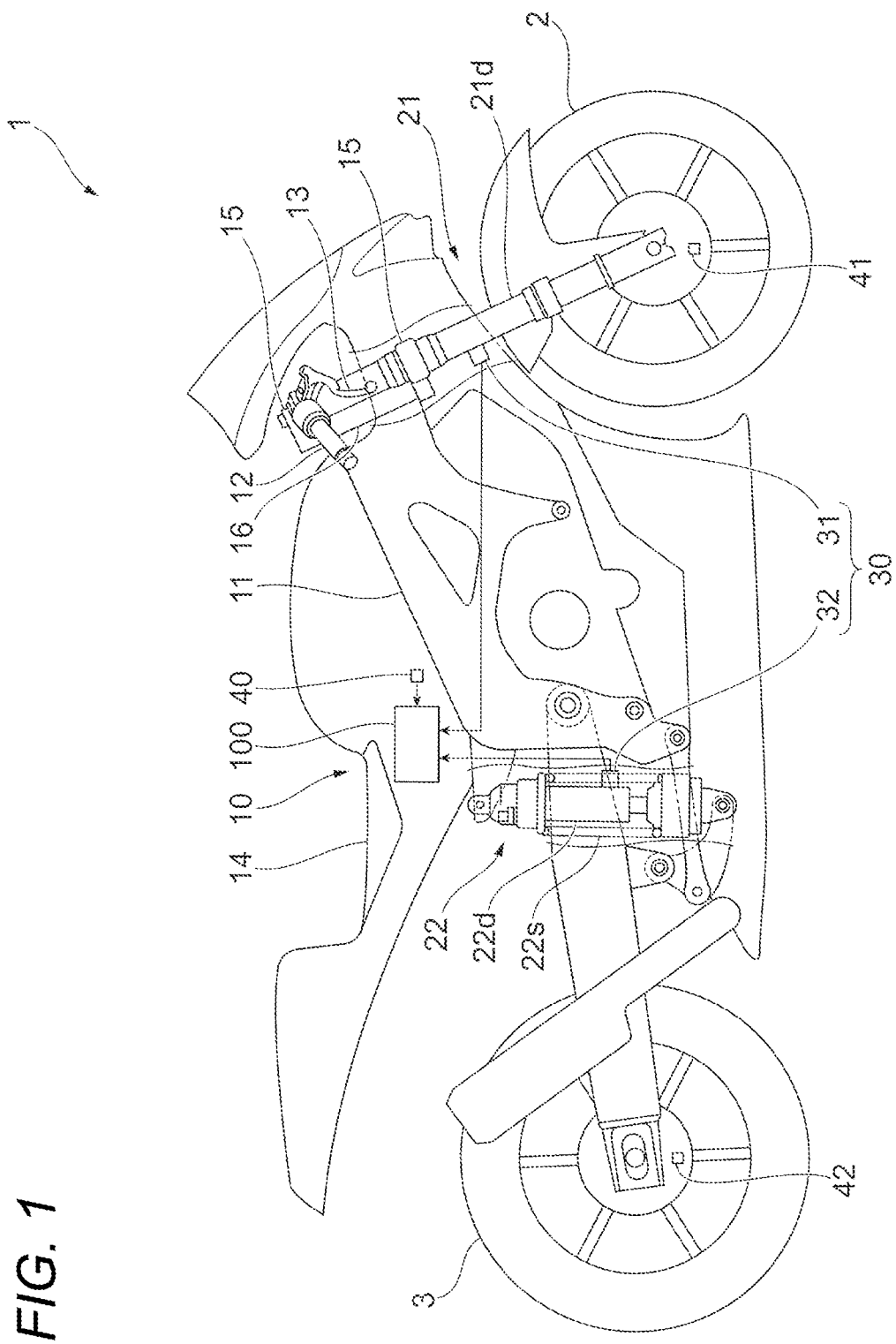
FIG. 1 is a view showing a schematic configuration of a motorcycle according to the present embodiment.

FIG. 1 is a view showing a schematic configuration of a motorcycle 1 according to the present embodiment.

The motorcycle 1 is provided with a front wheel 2, a rear wheel 3, and a vehicle body 10. The front wheel 2 is a wheel on a front side. The rear wheel 3 is a wheel on a rear side. The vehicle body 10 has a vehicle body frame 11, handles 12, brake levers 13, a seat 14, etc. The vehicle body frame 11 forms a frame of the motorcycle 1.

In addition, the motorcycle 1 has front wheel-side suspensions 21 coupling the front wheel 2 and the vehicle body 10 to each other. In addition, the motorcycle 1 is provided with two brackets 15 which retain the suspension 21 disposed on a left side of the front wheel 2 and the suspension 21 disposed on a right side of the front wheel 2, and a shaft 16 which is disposed between the two brackets 15. The shaft 16 is supported on the vehicle body frame 11 rotatably. Each suspension 21 is provided with a suspension spring (not shown) absorbing shock applied from a road surface etc. to the front wheel 2, and a damping device 21d damping vibration of the suspension spring.

In addition, the motorcycle 1 has a rear wheel-side suspension 22 coupling the rear wheel 3 and the vehicle body 10 to each other. The suspension 22 is provided with a suspension spring 22s absorbing shock applied from the road surface etc. to the rear wheel 3, and a damping device 22d damping vibration of the suspension spring 22s.

In the following description, the damping device 21d and the damping device 22d may be generically referred to as "damping device 200".

In addition, the front wheel-side suspension 21 and the rear wheel-side suspension 22 may be generically referred to as "suspension". In addition, the front wheel 2 and the rear wheel 3 may be generically referred to as "wheel".

Incidentally, in the present embodiment, the suspension disposed between the vehicle body 10 and the wheel of the vehicle (motorcycle 1) can be grasped as a suspension apparatus damping vibration propagated from the wheel.

Figure 2:
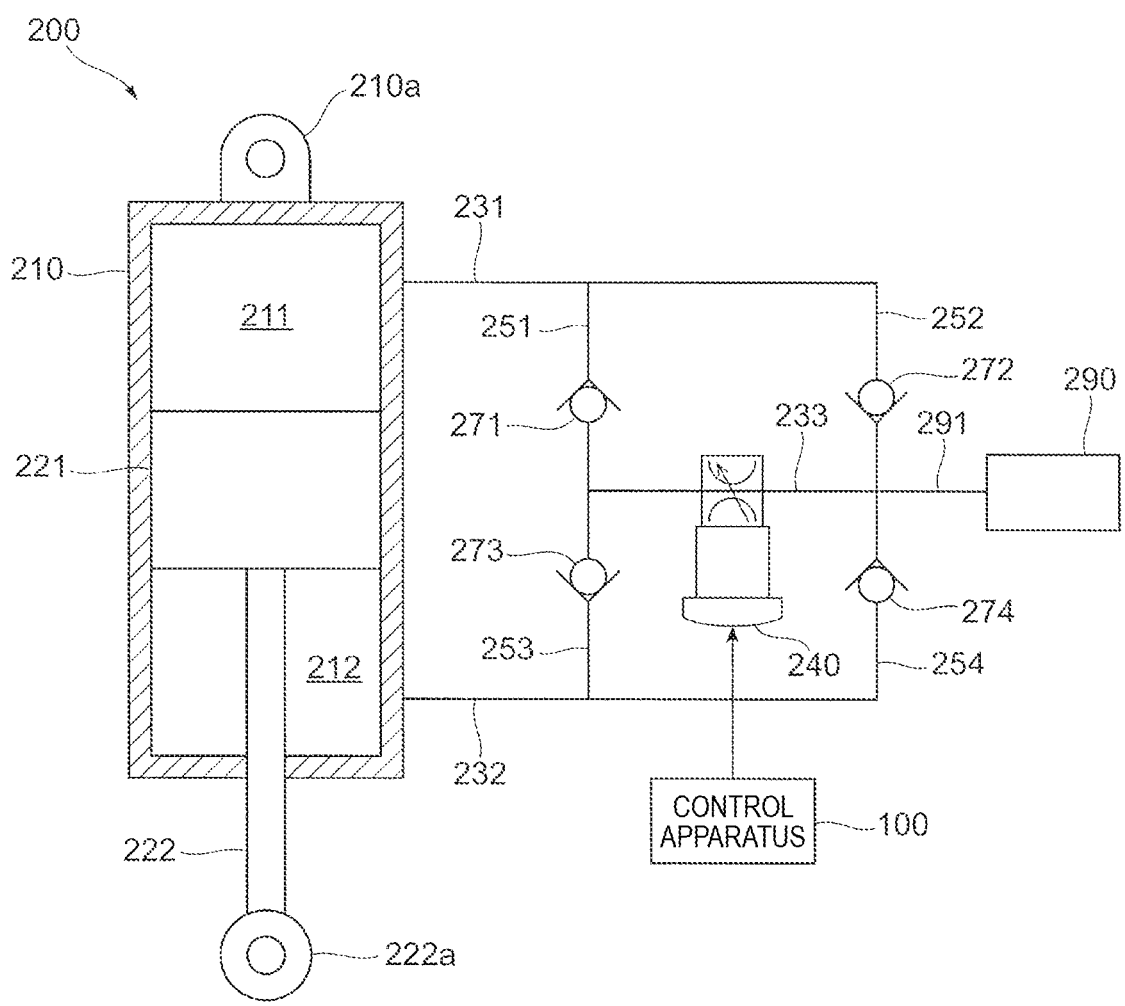
FIG. 2 is a view showing a schematic configuration of a damping device.
Figure 3:
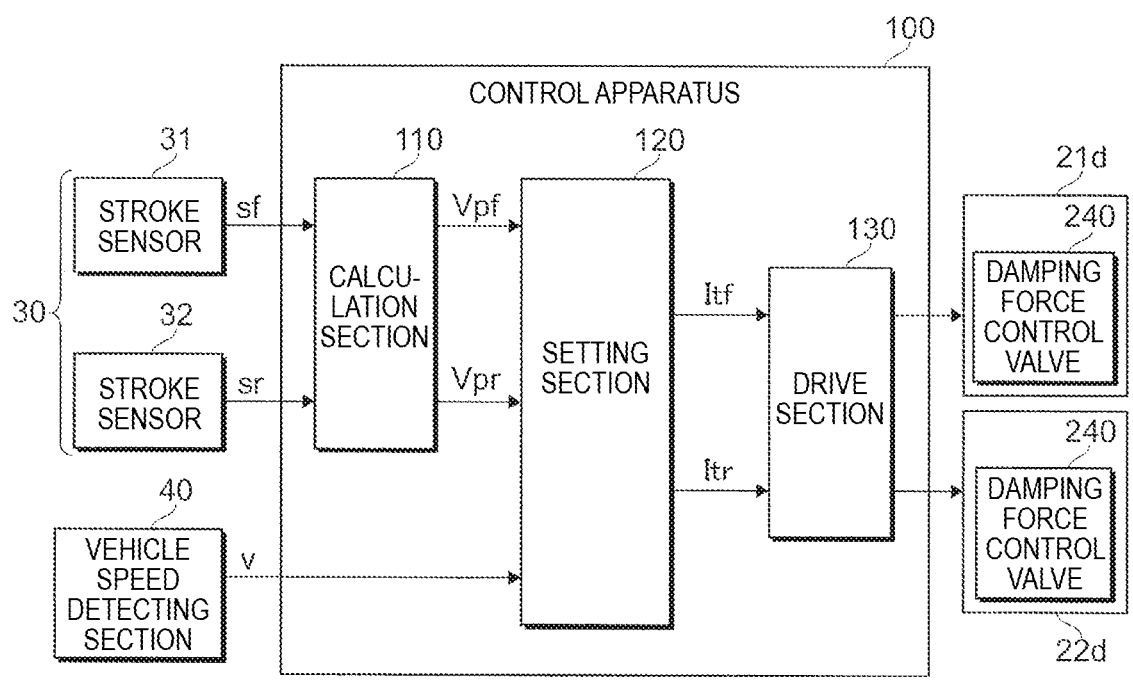
FIG. 3 is a diagram of a schematic configuration of a control apparatus.

FIG. 2 is a view showing a schematic configuration of the damping device 200. FIG. 3 is a diagram of a schematic configuration of a control apparatus 100.

The motorcycle 1 is provided with the control apparatus 100 controlling damping forces of the damping device 21d and the damping device 22d. Output signals from a stroke sensor 31 detecting an extension/compression amount of the suspension 21, and a stroke sensor 32 detecting an extension/compression amount of the suspension 22 are inputted to the control apparatus 100. In the following description, the stroke sensor 31 and the stroke sensor 32 may be generically referred to as "stroke sensor 30".

In addition, an output signal v etc. from a vehicle speed detecting section 40 detecting a vehicle speed Vc which is a movement speed of the motorcycle 1 is inputted to the control apparatus 100. The vehicle speed detecting section 40 detects the vehicle speed Vc based on output values from a rotation angle detecting sensor 41 detecting a rotation angle of the front wheel 2 and a rotation angle detecting sensor 42 detecting a rotation angle of the rear wheel 3.

(Damping Device)

The damping device 200 is provided with a cylinder 210 filled with working oil, a piston 221 received movably inside the cylinder 210, and a piston rod 222 retaining the piston 221. One side (upper side in FIG. 2) end portion 210a of the cylinder 210 is coupled to the vehicle body 10. The piston rod 222 retains the piston 221 at its one side end portion, and has the other side (lower side in FIG. 2) end portion 222a coupled to the wheel. Incidentally, the damping device in the present invention is not limited to such a form. The damping device in the present invention may have a configuration in which the other side end portion of the cylinder 210 is coupled to the wheel, and the other side end portion of the piston rod 222 retains the piston 221 while the one side end portion of the piston rod 222 is coupled to the vehicle body 10.

In the damping device 200, a compression stroke is performed in order to move the piston 221 toward the vehicle body 10 side (the upper side in FIG. 2) to thereby reduce the entire length of the damping device 200, and an extension stroke is performed in order to move the piston 221 toward the wheel side (the lower side in FIG. 2) to thereby increase the entire length of the damping device 200.

By the piston 221 received inside the cylinder 210, the cylinder 210 is internally sectioned into a compression-side oil chamber 211 and an extension-side oil chamber 212. Pressure of the working oil in the compression-side oil chamber 211 increases in the compression stroke. Pressure of the working oil in the extension-side oil chamber 212 increases in the extension stroke.

The damping device 200 has a first oil path 231 which is connected to the oil chamber 211 inside the cylinder 210, and a second oil path 232 which is connected to the oil chamber 212 inside the cylinder 210. In addition, the damping device 200 has a third oil path 233 which is provided between the first oil path 231 and the second oil path 232, and a damping force control valve 240 which is provided in the third oil path 233. In addition, the damping device 200 has a first branch path 251 which connects the first oil path 231 and one end portion of the third oil path 233 to each other, and a second branch path 252 which connects the first oil path 231 and the other end portion of the third oil path 233 to each other. In addition, the damping device 200 has a third branch path 253 which connects the second oil path 232 and the one end portion of the third oil path 233 to each other, and a fourth branch path 254 which connects the second oil path 232 and the other end portion of the third oil path 233 to each other.

In addition, the damping device 200 has a first check valve 271 which is provided in the first branch path 251 and which allows the working oil to move from the first oil path 231 toward the third oil path 233 and prohibits the working oil from moving from the third oil path 233 toward the first oil path 231. In addition, the damping device 200 has a second check valve 272 which is provided in the second branch path 252 and which allows the working oil to move from the third oil path 233 toward the first oil path 231 and prohibits the working oil from moving from the first oil path 231 toward the third oil path 233.

In addition, the damping device 200 has a third check valve 273 which is provided in the third branch path 253 and which allows the working oil to move from the second oil path 232 toward the third oil path 233 and prohibits the working oil from moving from the third oil path 233 toward the second oil path 232. In addition, the damping device 200 has a fourth check valve 274 which is provided in the fourth branch path 254 and which allows the working oil to move from the third oil path 233 toward the second oil path 232 and prohibits the working oil from moving from the second oil path 232 toward the third oil path 233.

In addition, the damping device 200 has a reservoir 290 and a reservoir passage 291. The reservoir 290 has a function for storing the working oil and supplying/discharging the working oil. The reservoir passage 291 connects the reservoir 290 and the other end portion of the third oil path 233 to each other.

The damping force control valve 240 has a solenoid. By control of an amount of a current conducted to the solenoid, pressure of the working oil passing through the valve can be controlled. The amount of the current conducted to the solenoid is controlled by the control apparatus 100. When oil pressure of one of the oil chamber 211 and the oil chamber 212 of the cylinder 210 becomes higher than releasing pressure, the damping force control valve 240 allows the working oil to flow into the other oil chamber. That is, when the oil pressure of the oil chamber 211 becomes higher than the releasing pressure, the damping force control valve 240 allows the working oil to flow into the oil chamber 212. Thus, the damping force control valve 240 changes a damping force (compression-side damping force) generated when the damping device 200 is in the compression stroke. In addition, when the oil pressure of the oil chamber 212 becomes higher than the releasing pressure, the damping force control valve 240 allows the working oil to flow into the oil chamber 211. Thus, the damping force control valve 240 changes a damping force (extension-side damping force) generated when the damping device 200 is in the extension stroke.

More specifically, when the piston 221 moves toward the oil chamber 211, the oil pressure of the oil chamber 211 increases. The working oil inside the oil chamber 211 moves toward the damping force control valve 240 through the first oil path 231 and the first branch path 251. The pressure of the working oil passing through the damping force control valve 240 is adjusted by valve pressure of the damping force control valve 240. Thus, the compression-side damping force is adjusted. The working oil passing through the damping force control valve 240 flows into the oil chamber 212 through the fourth branch path 254 and the second oil path 232.

On the other hand, when the piston 221 moves toward the oil chamber 212, the oil pressure of the oil chamber 212 increases. The working oil inside the oil chamber 212 moves toward the damping force control valve 240 through the second oil path 232 and the third branch path 253. The pressure of the working oil passing through the damping force control valve 240 is adjusted by the valve pressure of the damping force control valve 240. Thus, the extension-side damping force is adjusted. The working oil passing through the damping force control valve 240 flows into the oil chamber 211 through the second branch path 252 and the first oil path 231.

(Control Apparatus 100)

The control apparatus 100 is an arithmetic and logic circuit including a CPU, an ROM, an RAM, a backup RAM, etc.

A front wheel-side stroke signal sf in which an extension/compression amount of the suspension 21 detected by the stroke sensor 31 has been converted into an output signal, and a rear wheel-side stoke signal sr in which an extension/compression amount of the suspension 22 detected by the stroke sensor 32 has been converted into an output signal are inputted to the control apparatus 100. In addition thereto, the output signal v etc. corresponding to the vehicle speed Vc from the vehicle speed detecting section 40 is inputted to the control apparatus 100.

The control apparatus 100 is provided with a calculation section 110 which calculates stroke velocities Vpf and Vpr as change velocities of strokes based on the extension/compression amounts detected by the stroke sensor 30. In addition, the control apparatus 100 is provided with a setting section 120 which sets target currents Itf and Itr fed to the solenoids of the damping force control valves 240, based on the stroke velocities Vpf and Vpr calculated by the calculation section 110, the output signal v from the vehicle speed detecting section 40, etc. In addition, the control apparatus 100 is provided with a drive section 130 which drives the damping force control valves 240.

The calculation section 110 differentiates an output value from the stroke sensor 31 to thereby calculate the front wheel-side stroke velocity Vpf. In addition, the calculation section 110 differentiates an output value from the stroke sensor 32 to thereby calculate the rear wheel-side stroke velocity Vpr. The stroke velocity Vpf and the stroke velocity Vpr may be generically referred to as "stroke velocity Vp".

The setting section 120 sets the front wheel-side target current Itf fed to the solenoid of the damping force control valve 240 of the damping device 21d, based on the aforementioned stroke velocity Vpf. In addition, the setting section 120 sets the rear wheel-side target current Itr fed to the solenoid of the damping force control valve 240 of the damping device 22d, based on the aforementioned stroke velocity Vpr. Incidentally, a technique of setting the target current Itf by the setting section 120 and a technique of setting the target current Itr by the setting section 120 are similar or the same. In the following description, the target current Itf and the target current Itr may be generically referred to as "target current It". Incidentally, details of the setting section 120 will be described later.

The drive section 130 is provided with transistors (Field Effect Transistors: FETs) as switching elements, which are, for example, connected between a positive electrode side line of a power supply and coils of the solenoids of the damping force control valves 240 respectively. The drive section 130 drives gates of the transistors to enable the transistors to perform a switching operation to thereby control drive of the damping force control valves 240.

Setting Section 120

First Configuration Example

First, a first configuration example of the setting section 120 will be described here.

Figure 4:
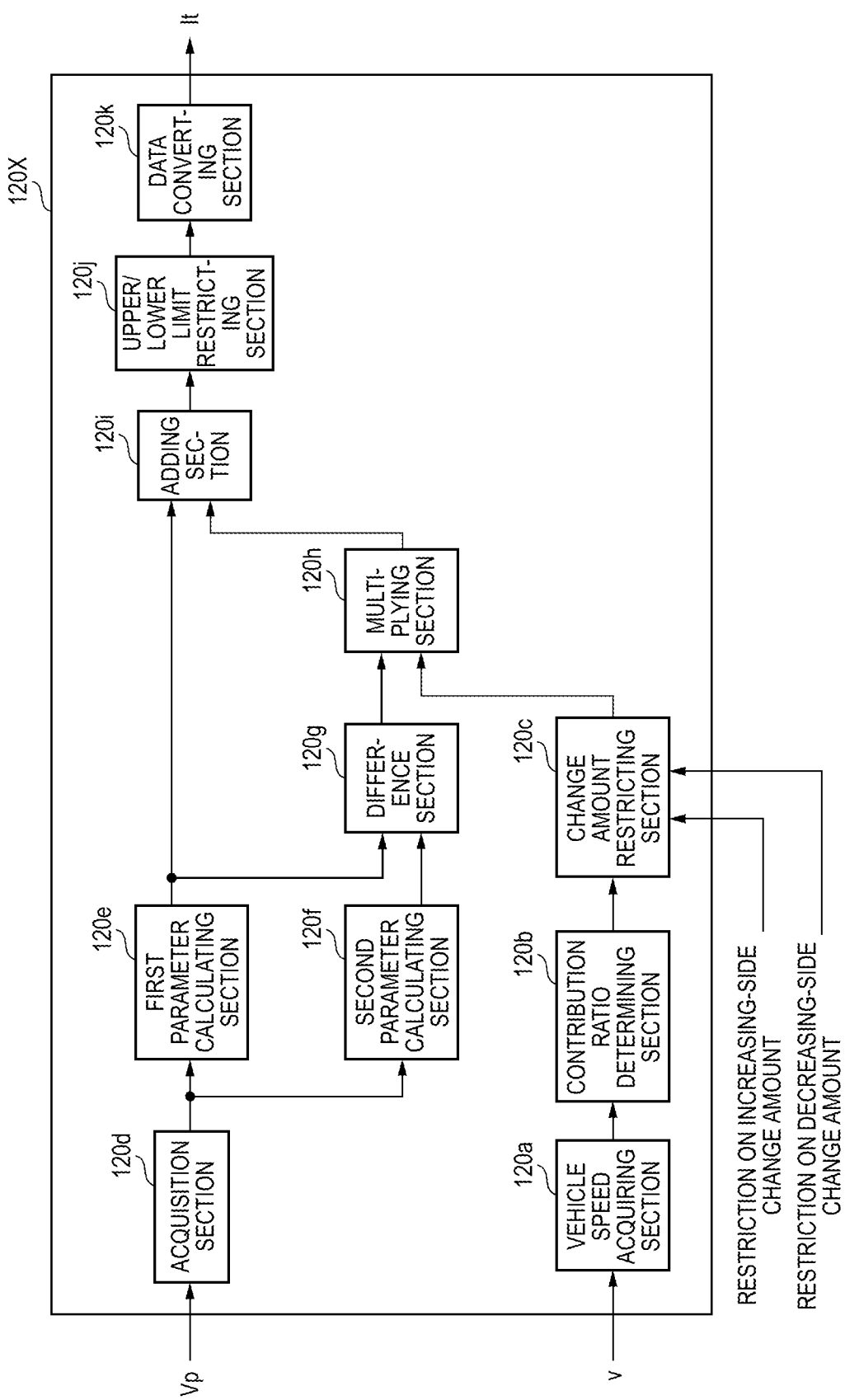
FIG. 4 is a block diagram for explaining a functional configuration of a setting section in a first configuration example.

FIG. 4 is a block diagram for explaining a functional configuration of a setting section 120X in the first configuration example. Incidentally, the setting section 120 in the first configuration example will be described as the setting section 120X below in order to be distinguished from a setting section 120Y in a second configuration example, which will be described later.

As illustrated in FIG. 4, the setting section 120X is provided with a vehicle speed acquiring section 120a, a contribution ratio determining section 120b, a change amount restricting section 120c, an acquisition section 120d, a first parameter calculating section 120e, a second parameter calculating section 120*f*, a difference section 120*g*, a multiplying section 120*h*, an adding section 120*i*, an upper/lower limit restricting section 120*j*, and a data converting section 120*k*.

The vehicle speed acquiring section 120*a* acquires a vehicle speed Vc as a speed of the vehicle. The vehicle speed Vc can be acquired based on an output signal v from the vehicle speed detecting section 40.

Based on the vehicle speed Vc, the contribution ratio determining section 120*b* determines a contribution ratio between a first parameter and a second parameter, which will be described later.

Figure 5:
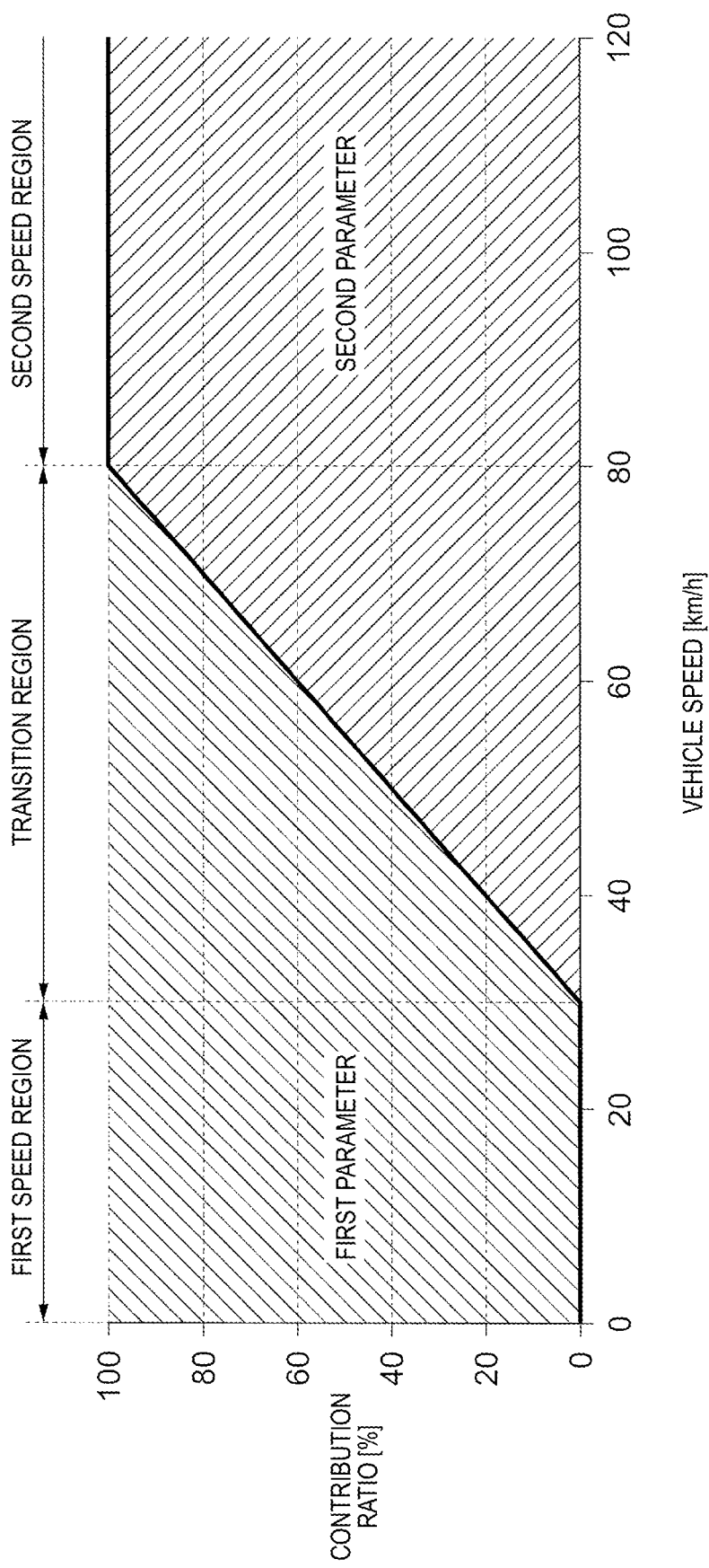
FIG. 5 is a view showing an example in which a distribution ratio determining section determines a contribution ratio between a first parameter and a second parameter.

FIG. 5 is a view showing an example in which the contribution ratio determining section 120*b* determines the contribution ratio between the first parameter and the second parameter. In FIG. 5, the abscissa expresses the vehicle speed, and the ordinate expresses the contribution ratio.

In the present embodiment, the vehicle speed is divided into a first speed region, a second speed region, and a transition region. The first speed region is a low speed-side speed region. The second speed region is a high speed-side speed region higher in speed than the first speed region. The transition region is disposed between the first speed region and the second speed region.

As illustrated in FIG. 5, the contribution ratio is set as 0% in the first speed region. In addition, the contribution ratio is set as 100% in the second speed region. Further, the contribution ratio is increased linearly from 0% to 100% in the transition region. That is, the contribution ratio may be referred to as a contribution ratio to the second parameter.

The contribution ratio determining section 120*b* determines the contribution ratio in a speed range of the transition region so as to reduce an influence (uncomfortable feeling) on a driver easily.

The change amount restricting section 120*c* in the present embodiment restricts a change amount of the contribution ratio determined by the contribution ratio determining section 120*b*.

Figure 6:
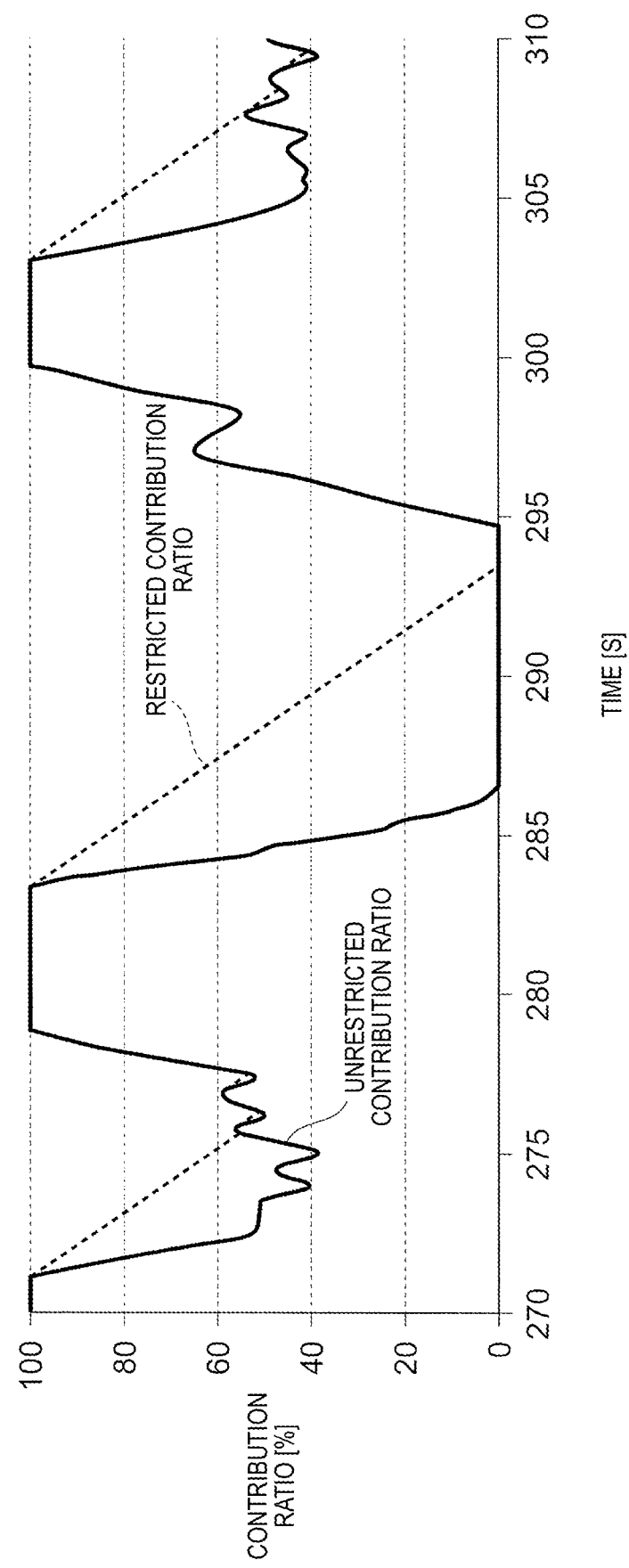
FIG. 6 is a view showing an example in which a change amount restricting section restricts a change amount of the contribution ratio.

FIG. 6 is a view showing an example in which the change amount restricting section 120*c* restricts the change amount of the contribution ratio.

In FIG. 6, the abscissa expresses time, and the ordinate expresses the contribution ratio. That is, FIG. 6 shows a change of the contribution ratio with passage of the time.

In FIG. 6, a solid line indicates an unrestricted contribution ratio determined by the contribution ratio determining section 120*b*, and a dotted line indicates a contribution ratio restricted by the change amount restricting section 120*c*. The change amount of the contribution ratio is restricted when the vehicle speed decreases. Thus, the influence (uncomfortable feeling) on the driver can be reduced easily.

Incidentally, the case where the change amount of the contribution ratio is restricted when the contribution ratio decreases is shown here. The present invention may be configured so that the change amount of the contribution ratio is restricted when the contribution ratio increases. In addition, a degree of the restriction when the contribution ratio decreases may be made different from a degree of the restriction when the contribution ratio increases.

Return to FIG. 4. Description will be continued. The acquisition section 120*d* acquires the stroke velocity Vp calculated by the calculation section 110.

The first parameter calculating section 120*e* calculates the first parameter which is a current value for controlling a damping force in the aforementioned first speed region which is the low speed-side speed region.

In addition, the second parameter calculating section 120*f* calculates the second parameter which is a current value for controlling the damping force in the aforementioned second speed region which is the high speed-side speed region.

The first parameter calculating section 120*e* and the second parameter calculating section 120*f* substitute the stroke velocity Vp acquired by the acquisition section 120*d* into maps each of which shows correspondence between the stroke velocity Vp and the first parameter or the second parameter and which have been, for example, created based on a rule of thumb and stored in an ROM in advance.

Figures 1, 7:
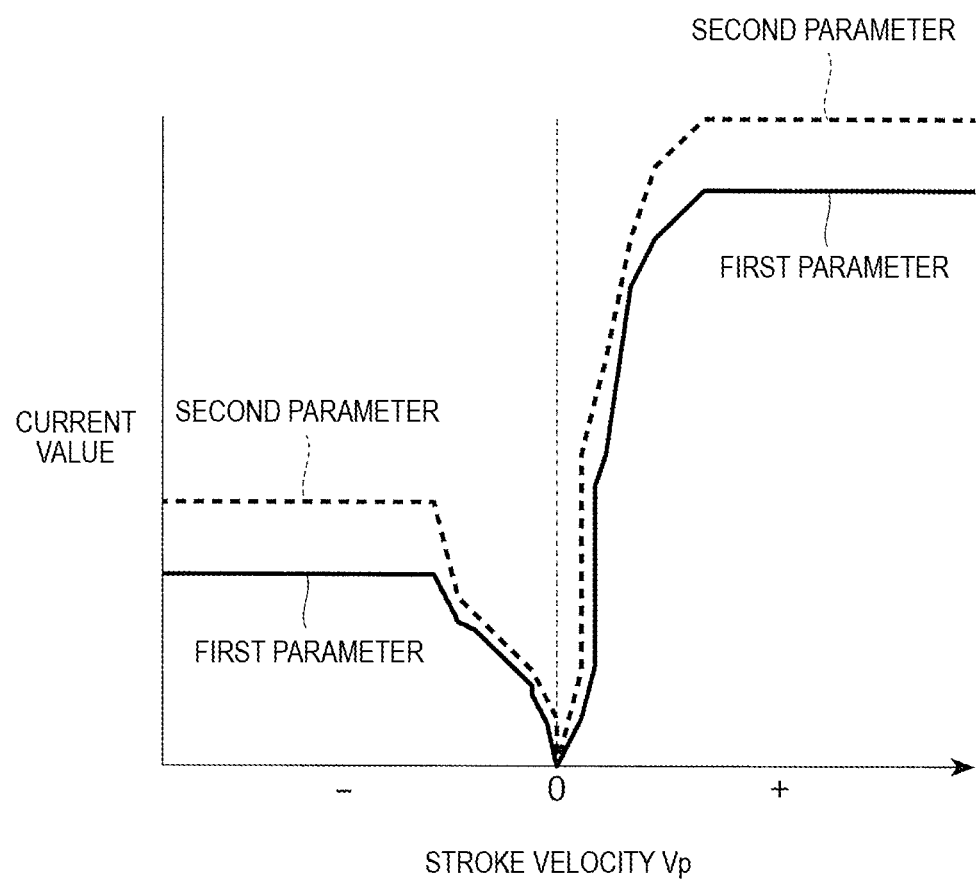

FIG. 7-1 is a view showing an example of maps each showing correspondence between the stroke velocity Vp and the current value. In FIG. 7-1, the abscissa expresses the stroke velocity Vp, and the ordinate expresses the current value.

Here, both the maps for the first parameter and the second parameter are arranged side by side for illustration. As illustrated in FIG. 7-1, when the stroke velocity Vp is 0, both the first parameter and the second parameter are 0. On the other hand, when the stroke velocity Vp is a positive value or a negative value, a predetermined current value is determined as the first parameter or the second parameter. Incidentally, in this example, the second parameter is a current value larger than the first parameter. According to this, in the slow speed-side speed region, the current value of the solenoid is reduced to thereby make the suspension easier to move. Therefore, ride comfortability is improved. On the other hand, in the high speed-side speed region, the current value of the solenoid is increased to thereby make the suspension more difficult to move. Therefore, travelling stability of the motorcycle 1 is improved.

However, the magnitude relation between the first parameter and the second parameter is not limited to the case shown in FIG. 7-1.

Figures 2A, 7:
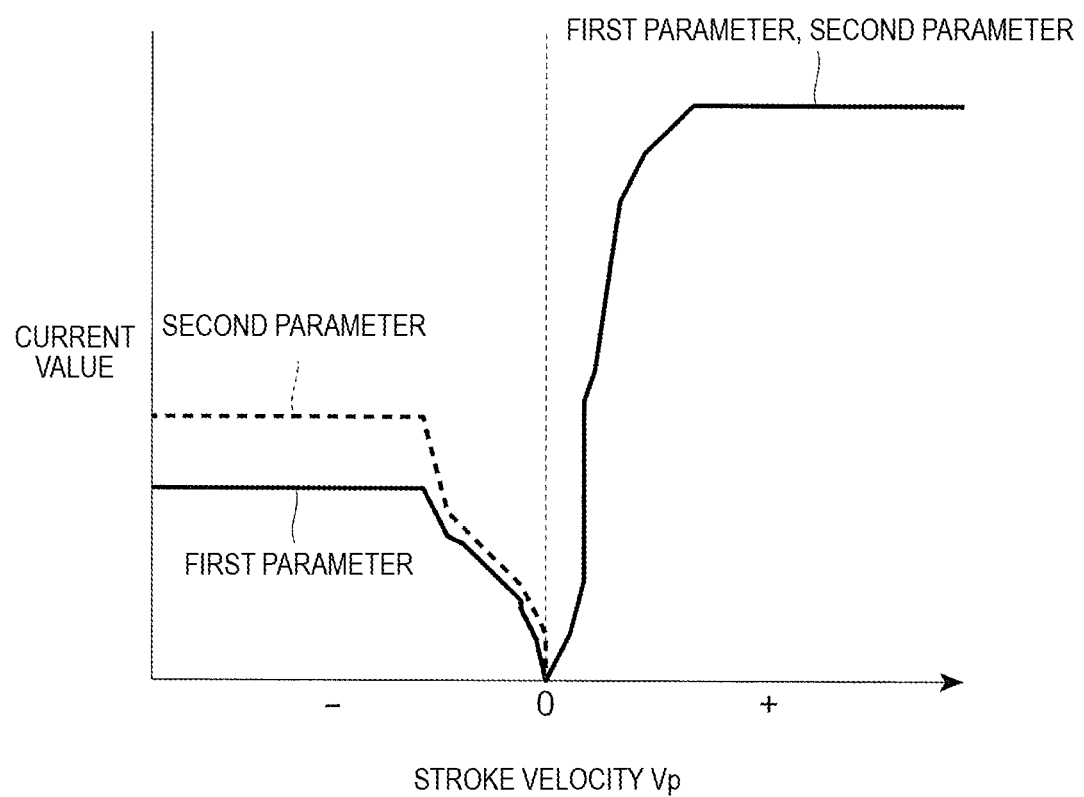
Figures 2B, 7:
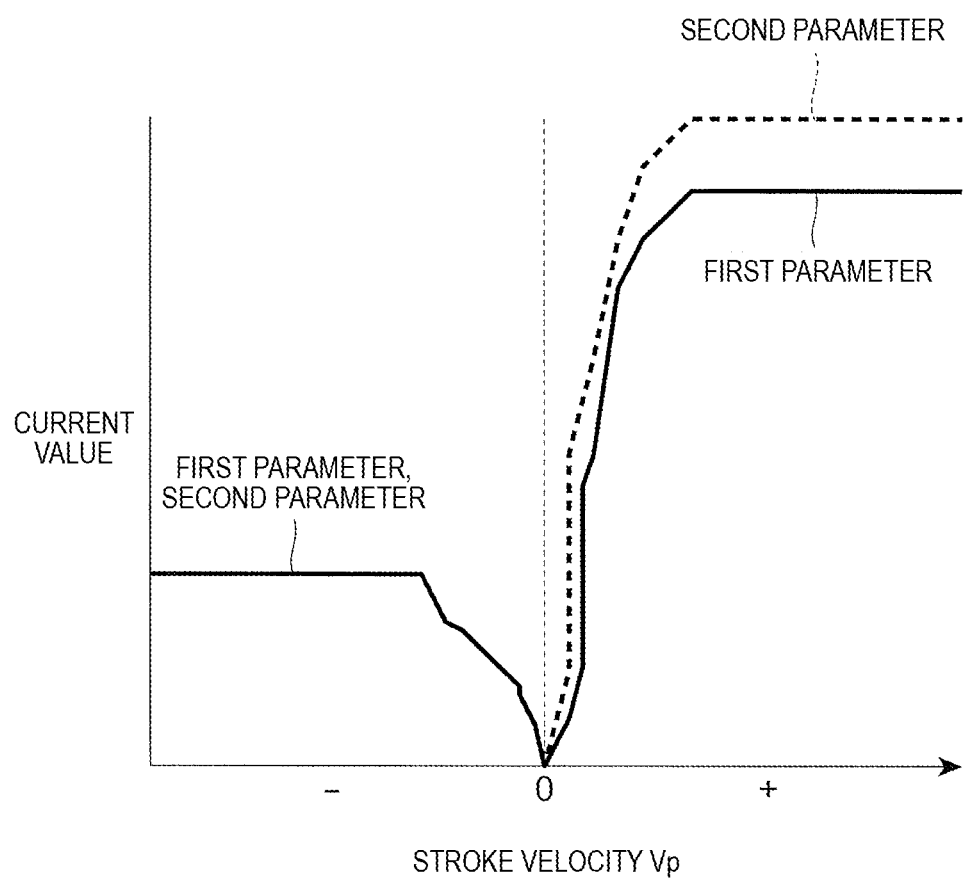
Figures 2C, 7:
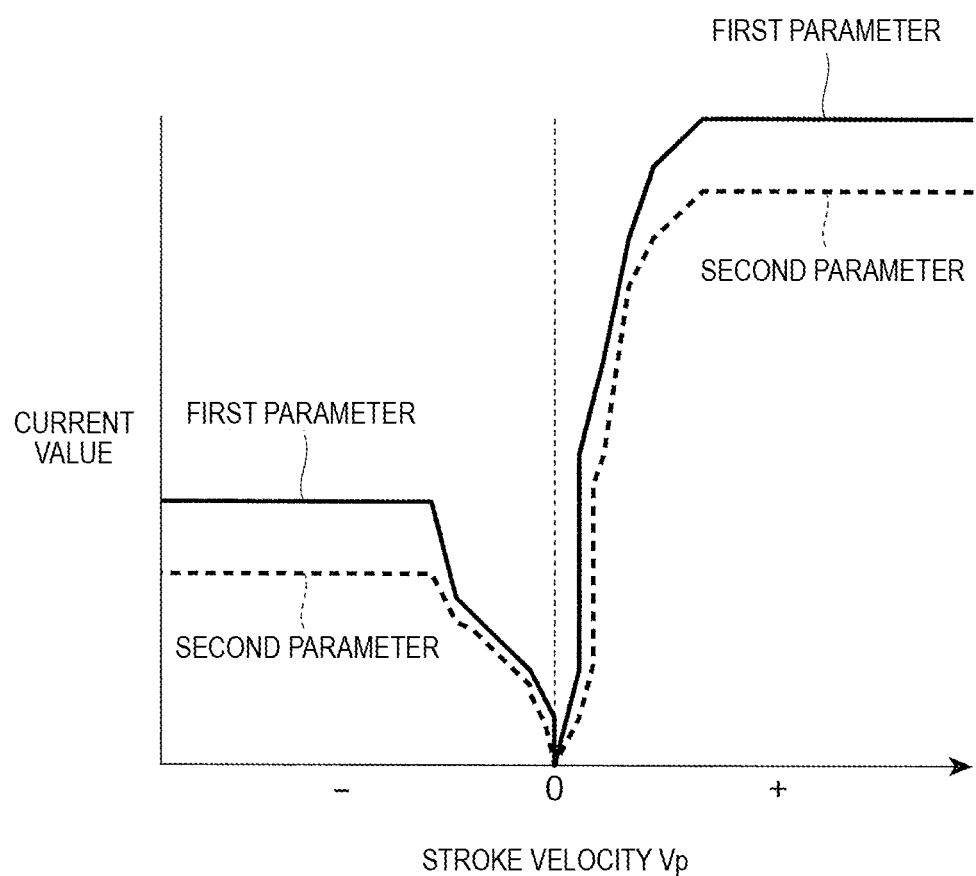
Figures 2D, 7:
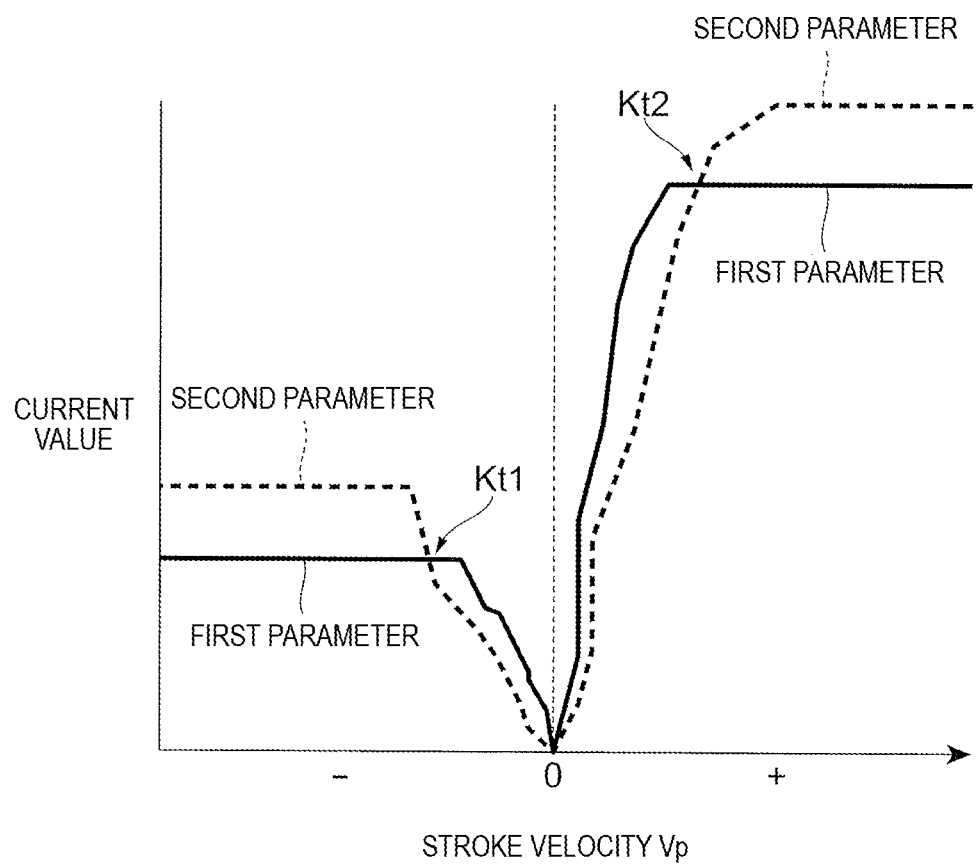

FIG. 7-2A to FIG. 7-2D are views showing other examples of the relation between the first parameter and the second parameter.

Of them, FIG. 7-2A shows a case where the first parameter and the second parameter are set as the same current value when the stroke velocity Vp is 0 and when the stroke velocity Vp is a positive value.

That is, in this case, as shown in FIG. 7-2A, the solid line indicating the first parameter and the dotted line indicating the second parameter overlap with each other when the stroke velocity Vp is 0 and when the stroke velocity Vp is a positive value. On the other hand, when the stroke velocity Vp is a negative value, the second parameter is a current value larger than the first parameter in a similar manner to or the same manner as the case of FIG. 7-1.

Moreover, FIG. 7-2B shows a case where the first parameter and the second parameter are set as the same current value when the stroke velocity Vp is 0 and when the stroke velocity Vp is a negative value.

That is, in this case, as shown in FIG. 7-2B, the solid line indicating the first parameter and the dotted line indicating the second parameter overlap with each other when the stroke velocity Vp is 0 and when the stroke velocity Vp is a negative value. On the other hand, when the stroke velocity Vp is a positive value, the second parameter is a current value larger than the first parameter in a similar manner to or the same manner as the case of FIG. 7-1.

Further, FIG. 7-2C shows a case where the first parameter is set as a current value larger than the second parameter when the stroke velocity Vp is a positive value and when the stroke velocity Vp is a negative value.

That is, in this case, as shown in FIG. 7-2C, the magnitude relation between the solid line indicating the first parameter and the dotted line indicating the second parameter is opposite to that in the case of FIG. 7-1.

Further, FIG. 7-2D shows a case where the magnitude relation between the current value of the first parameter and the current value of the second parameter in the case of FIG. 7-1 is partially alternated.

That is, in this case, as shown in FIG. 7-2D, the solid line indicating the first parameter and the dotted line indicating the second parameter intersect with each other at one or more places. In the case of FIG. 7-2D, an intersection point Kt1 appears when the stroke velocity Vp is a negative value and an intersection point Kt2 appears when the stroke velocity Vp is a positive value. That is, the solid line indicating the first parameter and the dotted line indicating the second parameter intersect with each other at two places, i.e. the intersection point Kt1 and the intersection point Kt2. The magnitude relation between the current value of the first parameter and the current value of the second parameter is alternated at the two places as boundaries.

The difference section 120g calculates a difference between the first parameter calculated by the first parameter calculating section 120e and the second parameter calculated by the second parameter calculating section 120f.

The multiplying section 120h multiplies the difference between the first parameter and the second parameter by the contribution ratio restricted by the change amount restricting section 120c so as to obtain a multiplication value.

The adding section 120i adds the multiplication value calculated by the multiplying section 120h to the first parameter so as to calculate an addition value which is a current value determined by the stroke velocity Vp to control the damping force of the suspension. The damping force is controlled by use of the addition value calculated by the adding section 120i. Thus, control can be performed using a value in which the first parameter and the second parameter are mixed at the contribution ratio.

In the first speed region which is the low speed-side speed region, the multiplication value calculated by the multiplying section 120h is 0 because the contribution ratio is 0%. Therefore, the addition value calculated by the adding section 120i is the first parameter. On the other hand, in the second speed region which is the high speed-side speed region, the multiplication value calculated by the multiplying section 120h is equal to the difference because the contribution ratio is 100%. Therefore, the addition value obtained by the adding section 120i is the second parameter. Further, in the transition region between the first speed region and the second speed region, the multiplication value calculated by the multiplying section 120h falls between 0 and the difference. Therefore, the addition value calculated by the adding section 120i falls between the first parameter and the second parameter.

The upper/lower limit restricting section 120j restricts upper and lower limits of the current value calculated by the adding section 120i.

The data converting section 120k converts the current value into an output signal suitable for use in the aforementioned solenoid, and outputs the converted output signal.

The setting section 120X in the present embodiment controls the damping force of the suspension by use of the addition value as described above. Accordingly, the first parameter calculating section 120e, the second parameter calculating section 120f, the difference section 120g, the multiplying section 120h, the adding section 120i, the upper/lower limit restricting section 120j and the data converting section 120k can be grasped as a damping force controlling section which controls the damping force of the suspension based on the restricted contribution ratio and the stroke velocity Vp.

Second Configuration Example

Next, a second configuration example of the setting section 120 will be described.

FIG. 8 is a block diagram for explaining a functional configuration of a setting section 120Y in the second configuration example. Incidentally, the setting section 120 in the second configuration example will be described as the setting section 120Y below in order to be distinguished from the setting section 120X in the first configuration example.

In a similar manner to or the same manner as the setting section 120X shown in FIG. 4, the setting section 120Y shown in FIG. 8 is provided with a velocity speed acquiring section 120a, an acquisition section 120d, a first parameter calculating section 120e, a second parameter calculating section 120f, a difference section 120g, a multiplying section 120h, an adding section 120i, and an upper/lower limit restricting section 120j, and a data converting section 120h. On the other hand, in comparison with the setting section 120X shown in FIG. 4, the setting section 120Y is provided with a change amount restricting section 120l in place of the change amount restricting section 120c, and a contribution ratio determining section 120m in place of the contribution ratio determining section 120b.

In addition, the setting section 120Y shown in FIG. 8 is different from the setting section 120X shown in FIG. 4 at a point that the change amount restricting section 120l is positioned anterior to the contribution ratio determining section 120m. That is, the positions of the change amount restricting section 120l and the contribution ratio determining section 120m are placed in reverse order to those in the setting section X shown in FIG. 4.

In the present embodiment, operation of the change amount restricting section 120l is different from that in the setting section 120X shown in FIG. 4, but operations of the other functional sections are similar to or the same as those in the setting section 120X shown in FIG. 4. Accordingly, the change amount restricting section 120l will be mainly described below, and description about the other functional sections will be omitted.

The change amount restricting section 120l restricts a change amount of a vehicle speed acquired by the vehicle speed acquiring section 120a. Then, the restricted change amount of the vehicle speed is passed through the contribution ratio determining section 120m. Thus, data to be inputted to the multiplying section 120h can be made similar to or the same as those in the aforementioned first configuration example. That is, the change amount of the vehicle speed is restricted in the change amount restricting section 120l, and the contribution ratio determining section 120m determines a contribution ratio between a first parameter and a second parameter by the method described in FIG. 5 based on the vehicle speed whose change amount has been restricted. As a result, the data to be inputted to the multiplying section 120h can be made similar to or the same as those in the first configuration example. When the setting section 120Y is set in such a form, the parameters defining the change amount can be regarded as the change amount of the vehicle speed per calculation cycle, i.e. as an acceleration. In addition, the change amount restricting section 120l preferably restricts the change amount of the vehicle speed in the aforementioned transition region. Thus, it is possible to obtain an output similar to or the same as that in the case where the change amount of the contribution ratio is directly restricted.

When the change amount of the vehicle speed is restricted in the transition region, the change amount restricting section 120*l* determines the contribution ratio in the transition region and does not determine the contribution ratio in any other region, i.e. the first speed region or the second speed region. That is, it is determined that the contribution ratio is 0% in the first speed region, and the contribution ratio is 100% in the second speed region. Accordingly, it is unnecessary to determine the contribution ratio in these speed regions. Therefore, the transition region is set as a speed range for restricting the change amount of the vehicle speed.

Figure 9:
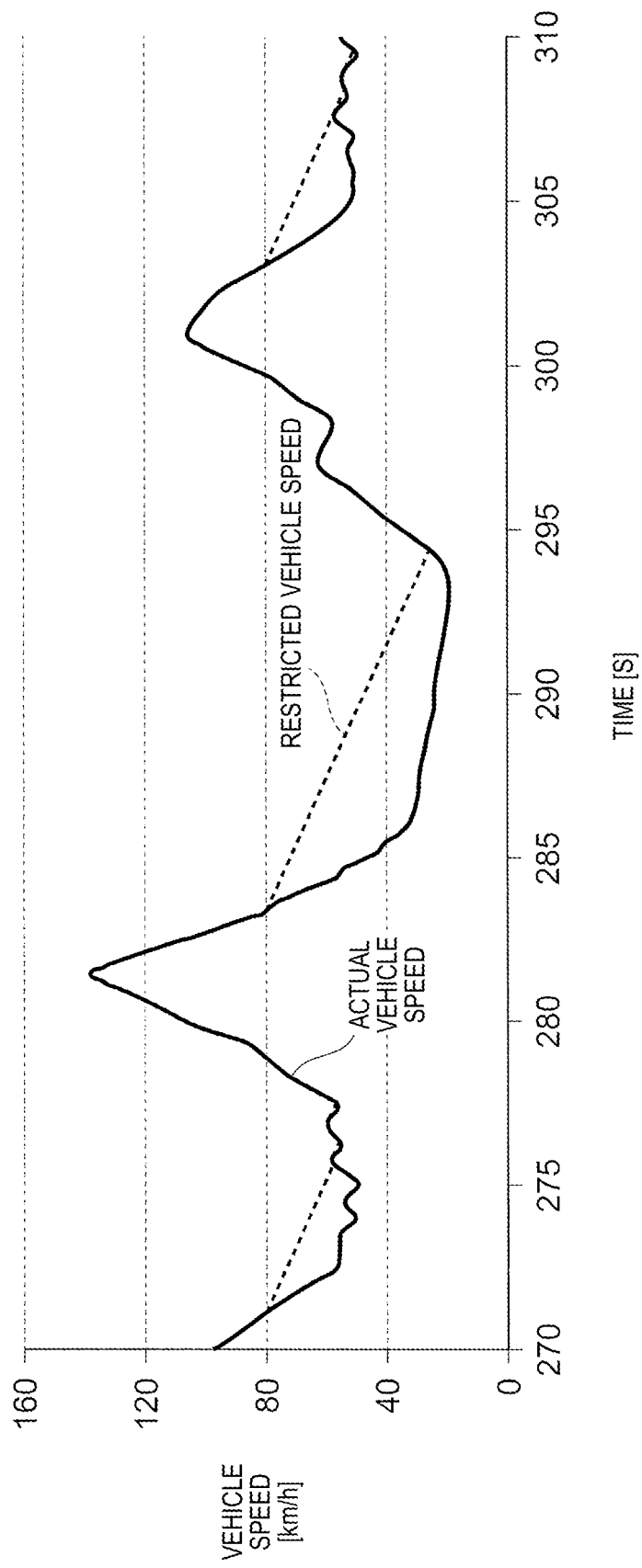
FIG. 9 is a view showing an example in which a change amount restricting section restricts a change amount of a vehicle speed.

FIG. 9 is a view showing an example in which the change amount restricting section 120*l* restricts the change amount of the vehicle speed.

In FIG. 9, the abscissa expresses time, and the ordinate expresses the vehicle speed. That is, FIG. 9 shows a change of the vehicle speed with passage of the time.

On this occasion, the change amount restricting section 120*l* sets, for example, a range of 30 km/h to 80 km/h as a predetermined speed range. In the speed range, the change amount restricting section 120*l* restricts the change amount of the vehicle speed when, for example, an acceleration of 0.3 G or higher is generated due to the change of the vehicle speed. In FIG. 9, the solid line expresses an actual vehicle speed, and the dotted line expresses the vehicle speed which has been restricted by the change amount restricting section 120*l*. A degree of the restriction is determined by a restriction on an increasing-side change amount when the vehicle speed increases. On the other hand, a degree of the restriction is determined by a restriction on a decreasing-side change amount when the vehicle speed decreases. The restriction on the increasing-side change amount and the restriction on the decreasing-side change amount are set in advance and stored in an ROM etc.

Incidentally, FIG. 9 shows the case where the change amount of the vehicle speed is restricted when the vehicle speed decreases, and, on the other hand, the change amount of the vehicle speed is not restricted when the vehicle speed increases. This is because an influence on a driver is larger during the decrease of the vehicle speed than during the increase of the vehicle speed, and the driver is apt to feel uncomfortable during the decrease of the vehicle speed. Specifically, when, for example, the vehicle has been decelerated suddenly, the current value is suddenly changed from a current value (second parameter) set in a high speed-side speed region (the second speed region) to a current value (first parameter) set in a low speed-side speed region (the first speed region). Thus, the damping force of the suspension is apt to decrease suddenly. In this case, the driver feels as if the damping force of the suspension disappeared suddenly. On the other hand, when, for example, the vehicle has been accelerated suddenly, a reverse phenomenon occurs but the driver hardly feels uncomfortable even when the damping force of the suspension increases suddenly. Therefore, restriction on the change amount of the vehicle speed when the vehicle speed decreases is more important. Incidentally, the present invention is not limited to such a form. The present invention may be configured to restrict the change amount of the vehicle speed when the vehicle speed increases. In addition, a degree of the restriction when the vehicle speed decreases may be made different from a degree of the restriction when the vehicle speed increases.

According to the aforementioned form, it is possible to provide a control apparatus 100 by which an influence on the driver can be easily reduced even under large acceleration or deceleration of the vehicle while an effect of vehicle speed-dependent control is maintained.

Modification

Incidentally, the suspension apparatuses (suspensions) damping vibration propagated from the wheels respectively and the control apparatus 100 controlling damping forces of the suspensions in each of the aforementioned examples can be combined and grasped as a suspension system.

Figure 10A:
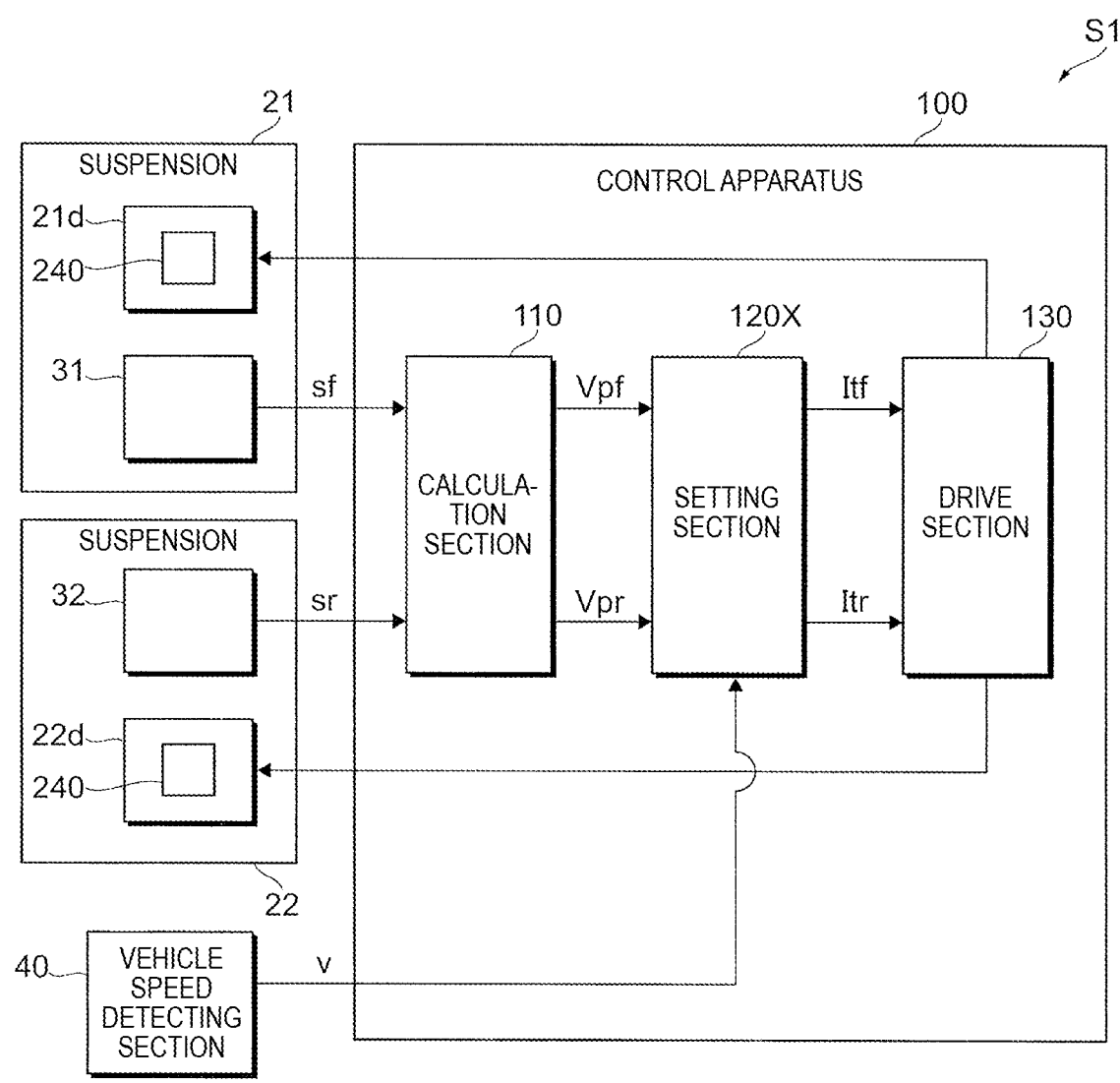
FIG. 10A is a diagram for explaining a suspension system according to the first configuration example.

FIG. 10A is a diagram for explaining a suspension system according to the first configuration example.

Incidentally, the suspension system S1 in the first configuration example will be described as a suspension system S1 below in order to be distinguished from a suspension system S2 in the second configuration example, which will be described later.

The suspension system S1 shown in FIG. 10A is provided with a front wheel-side suspension 21, a rear wheel-side suspension 22, a vehicle speed detecting section 40, and a control apparatus 100.

As described above, the control apparatus 100 acquires a front wheel-side stroke signal sf from a stroke sensor 31 of the suspension 21. In addition, the control apparatus 100 acquires a rear wheel-side stroke signal sr from a stroke sensor 32 of the suspension 22. Further, the control apparatus 100 acquires an output signal v from the vehicle speed detecting section 40.

In the control apparatus 100, a calculation section 110 calculates a front wheel-side stroke velocity Vpf from the stroke signal sf. In addition, the calculation section 110 calculates a rear wheel-side stroke velocity Vpr from the stroke signal sr. Further, a setting section 120X calculates a front wheel-side target current Itf from the stroke velocity Vpf and a vehicle speed obtained from the output signal v. In addition, the setting section 120X calculates a rear wheel-side target current Itr from the stroke velocity Vpr and the vehicle speed. On this occasion, a contribution ratio determining section 120*b* in the setting section 120X determines a contribution ratio between a first parameter and a second parameter based on the vehicle speed, as described in FIG. 4. In addition, a change amount restricting section 120*c* restricts a change amount of the contribution ratio determined by the contribution ratio determining section 120*b*. A drive section 130 controls drive of a damping force control valve 240 of a front wheel-side damping device 21*d* based on the target current Itf. In addition, the drive section 130 controls drive of a damping force control valve 240 of a rear wheel-side damping device 22*d* based on the target current Itr.

Figure 10B:
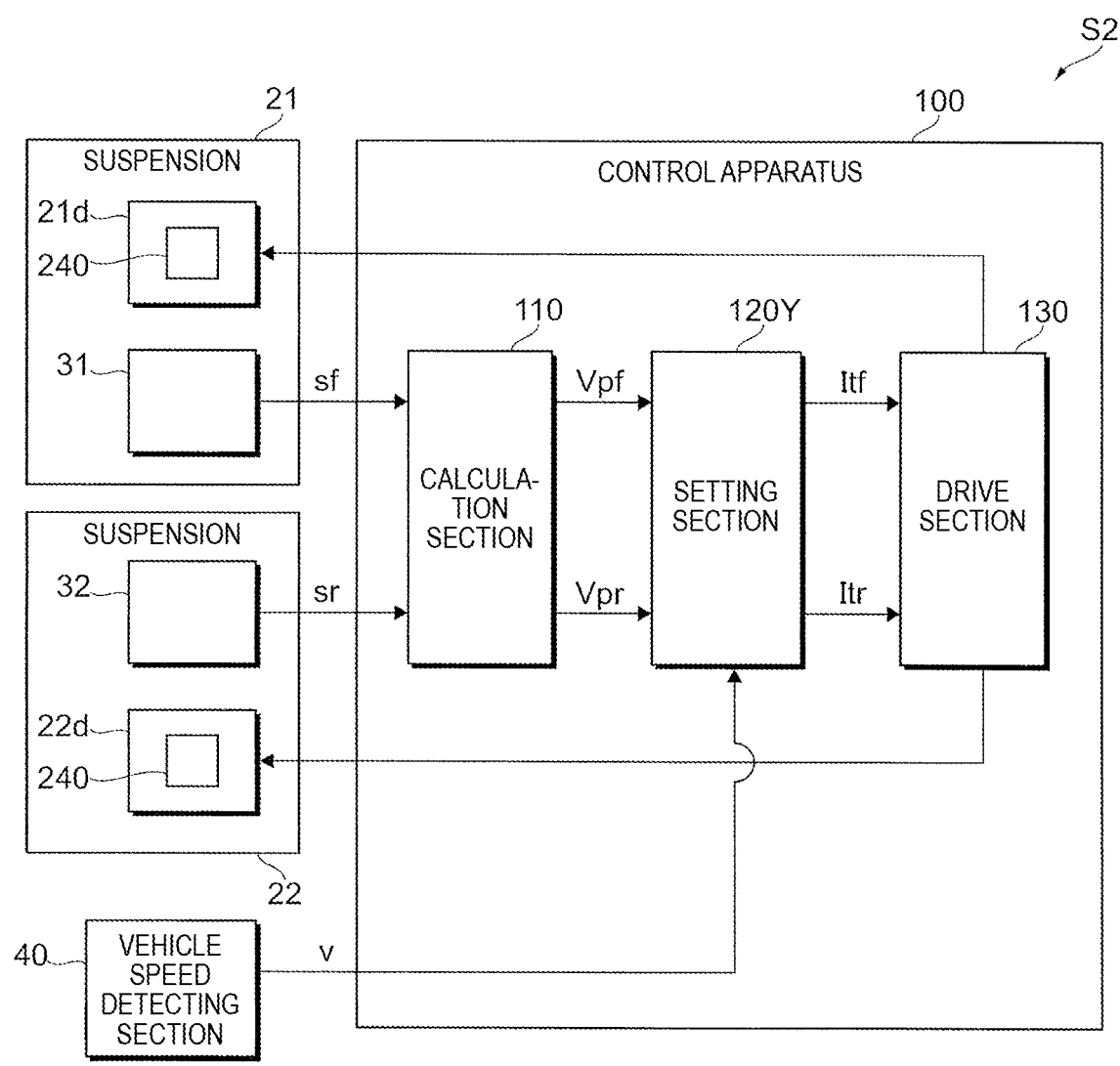
FIG. 10B is a diagram for explaining a suspension system according to the second configuration example.

FIG. 10B is a diagram for explaining the suspension system in the second configuration example.

Incidentally, the suspension system S2 in the second configuration example will be described as the suspension system S2 below in order to be distinguished from the suspension system S1 in the first configuration example.

The suspension system S2 in the second configuration example is different from the suspension system S1 in the first configuration example shown in FIG. 10A at a point that the setting section 120X is replaced by a setting section 120Y. Except this point, the suspension system S2 in the second configuration example is the same as the suspension system S1 in the first configuration example. The setting section 120Y calculates a front wheel-side target current Itf from a stroke velocity Vpf and a vehicle speed obtained from an output signal v in a similar manner to or the same manner as the setting section 120X. In addition, the setting section 120Y calculates a rear wheel-side target current Itr from a stroke velocity Vpr and the vehicle speed. A change amount restricting section 120l in the setting section 120Y restricts a change amount of the vehicle speed, as described in FIG. 8. A contribution ratio determining section 120m determines a contribution ratio between a first parameter and a second parameter based on the vehicle speed whose change amount has been restricted.

In addition, the process performed by the setting section 120 may be also grasped as an invention of a control method for a suspension apparatus.

Figure 11:
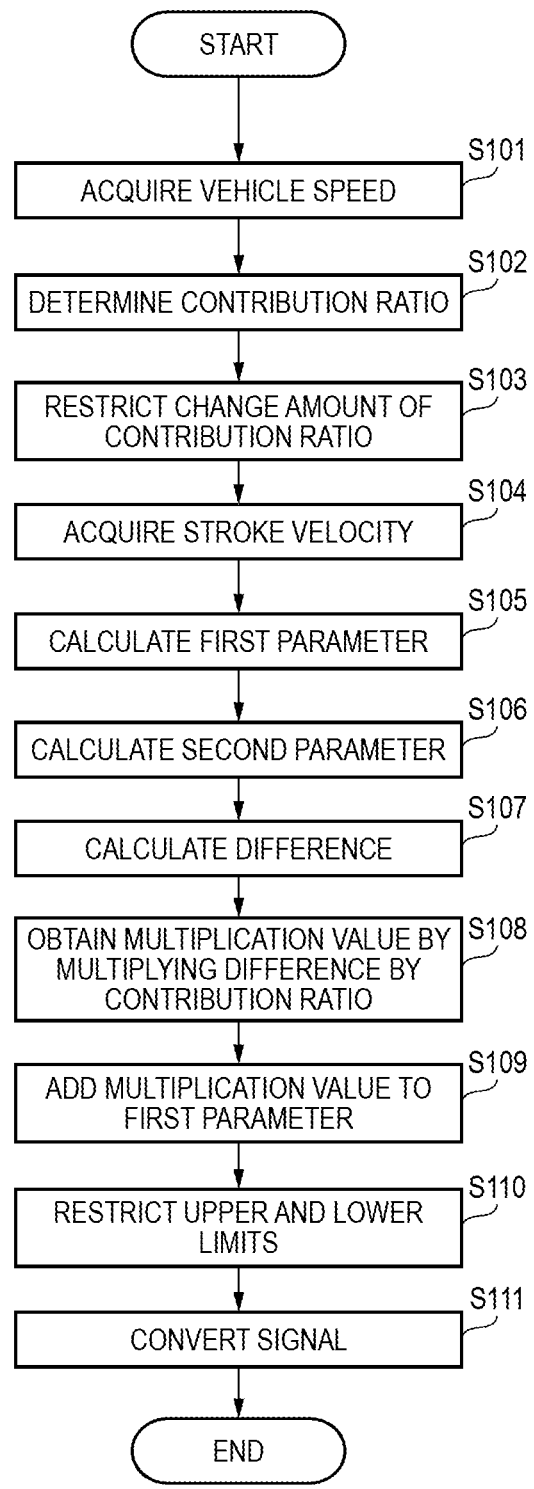
FIG. 11 is a flow chart for explaining a process performed by the setting section in the first configuration example.

FIG. 11 is a flow chart for explaining the process performed by the setting section 120 (the setting section 120X) in the first configuration example.

First, the vehicle speed acquiring section 120a acquires a vehicle speed Vc as a speed of the vehicle based on an output signal v from the vehicle speed detecting section 40 (step 101).

Next, the contribution ratio determining section 120b determines a contribution ratio between a first parameter and a second parameter based on the vehicle speed Vc (step 102). This can be performed by the method described in FIG. 5.

Further, the change amount restricting section 120c restricts a change amount of the contribution ratio determined by the contribution ratio determining section 120b (step 103). This can be performed by the method described in FIG. 6.

On the other hand, the acquisition section 120d acquires a stroke velocity Vp calculated by the calculation section 110 (step 104).

Next, the first parameter calculating section 120e calculates the first parameter (step 105). Further, the second parameter calculating section 120f calculates the second parameter (step 106). This can be calculated by use of the maps each showing correspondence between the stroke velocity Vp and a current value, as shown in FIG. 7-1 or any of FIG. 7-2A to FIG. 7-2D.

Further, the difference section 120g calculates a difference between the first parameter calculated by the first parameter calculating section 120e and the second parameter calculated by the second parameter calculating section 120f (step 107).

The multiplying section 120h multiplies the difference between the first parameter and the second parameter by the contribution ratio restricted by the change amount restricting section 120c to thereby obtain a multiplication value (step 108).

Further, the adding section 120i adds the multiplication value calculated by the multiplying section 120h to the first parameter (step 109). Thus, the adding section 120i can calculate an addition value which is a current value for controlling a damping force of the suspension.

Next, the upper/lower limit restricting section 120j restricts upper and lower limits of the current value calculated by the adding section 120i (step 110).

The data converting section 120k converts the current value into an output signal suitable for use in the aforementioned solenoid, and outputs the converted output signal (step 111).

Figure 12:
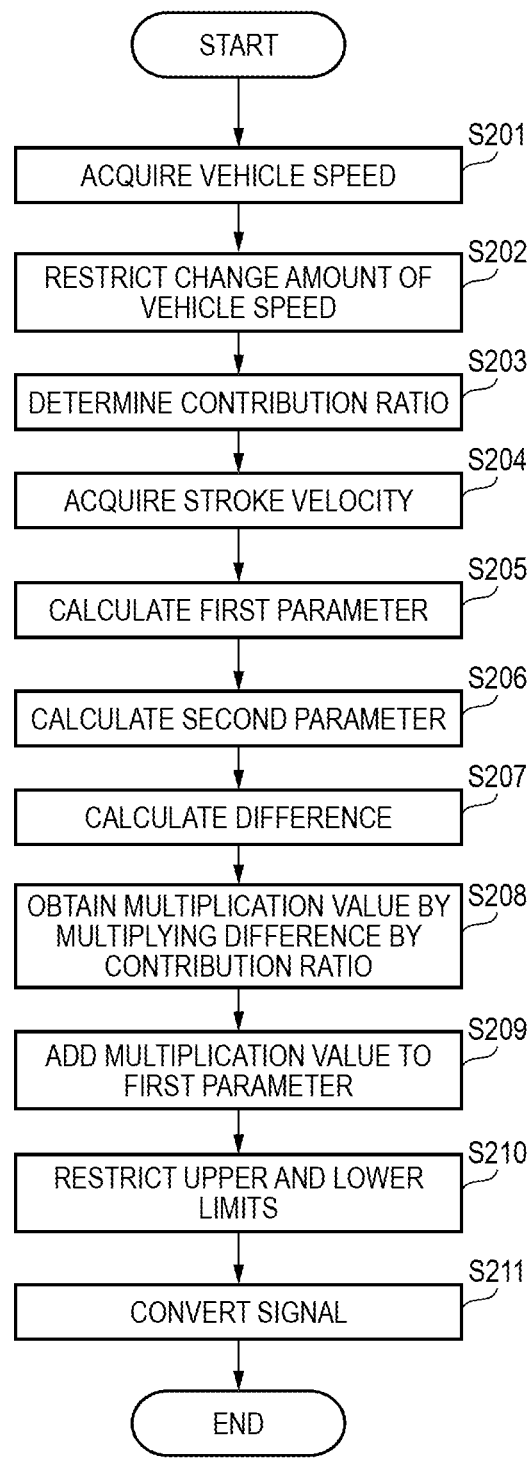
FIG. 12 is a flow chart for explaining a process performed by the setting section in the second configuration example.

Moreover, FIG. 12 is a flow chart for explaining the process performed by the setting section 120 (the setting section 120Y) in the second configuration example.

In FIG. 12, a step 201 is similar to or the same as the step 101 of FIG. 11. In addition, steps 204 to 211 are similar to or the same as the steps 104 to 111. Accordingly, description about these steps 201 and 204 to 211 will be omitted, and steps 202 and 203 will be described.

The change amount restricting section 120l restricts a change amount of a vehicle speed acquired by the vehicle speed acquiring section 120a (the step 202). This can be performed by the method described in FIG. 9.

Next, the contribution ratio determining section 120m determines a contribution ratio between a first parameter and a second parameter based on the vehicle speed Vc restricted by the change amount restricting section 120l (the step 203). This can be performed by the method described by FIG. 5.

It can be considered that a control method for a suspension apparatus in the first configuration example includes the following five steps.

(1) A vehicle speed acquiring step of acquiring a vehicle speed as a speed of a vehicle The vehicle speed acquiring step corresponds to the step 101 in which the vehicle speed acquiring section 120a acquires the vehicle speed Vc as the speed of the vehicle in the example of FIG. 11.

(2) An acquisition step of acquiring a stroke velocity of the suspension apparatus (suspension) disposed between a vehicle body and a wheel to damp vibration propagated from the wheel The acquisition step corresponds to the step 104 in which the acquisition section 120d acquires the stroke velocity Vp calculated by the calculation section 110 in the example of FIG. 11.

(3) A contribution ratio determining step of determining a contribution ratio between a first parameter and a second parameter based on the vehicle speed, the first parameter serving for controlling a damping force in a first speed region of the vehicle, the second parameter serving for controlling the damping force in a second speed region which is a speed region higher in speed than the first speed region The contribution ratio determining step corresponds to the step 102 in which the contribution ratio determining section 120b determines the contribution ratio between the first parameter and the second parameter based on the vehicle speed Vc in the example of FIG. 11.

(4) A change amount restricting step of restricting a change amount of the contribution ratio The change amount restricting step corresponds to the step 103 in which the change amount restricting section 120c restricts the contribution ratio in the example of FIG. 11.

(5) A damping force controlling step of controlling the damping force of the suspension apparatus based on the restricted contribution ratio and the stroke velocity The damping force controlling step corresponds to steps in which the first parameter calculating section 120e, the second parameter calculating section 120f, the difference section 120g, the multiplying section 120h, the adding section 120i, the upper/lower limit restricting section 120j and the data converting section 120k control the damping force of the suspension apparatus (suspension) based on the restricted contribution ratio and the stroke velocity Vp. That is, the damping force controlling step corresponds to the steps 105 to 111 in the example of FIG. 11.

In addition, it is possible to consider that a control method for a suspension apparatus in the second configuration example includes the following five steps.

(1) A vehicle speed acquiring step of acquiring a vehicle speed as a speed of a vehicle The vehicle speed acquiring step corresponds to the step 201 in which the vehicle speed acquiring section 120a acquires the vehicle speed Vc as the speed of the vehicle in the example of FIG. 12.

(2) An acquisition step of acquiring a stroke velocity of the suspension apparatus (suspension) disposed between a vehicle body and a wheel to damp vibration propagated from the wheel The acquisition step corresponds to the step 204 in which the acquisition section 120d acquires the stroke velocity Vp calculated by the calculation section 110 in the example of FIG. 12.

(3) A change amount restricting step of restricting a change amount of the vehicle speed The change amount restricting step corresponds to the step 202 in which the change amount restricting section 120l limits the change amount of the vehicle speed in the example of FIG. 12

(4) A contribution ratio determining step of determining a contribution ratio between a first parameter and a second parameter based on the restricted vehicle speed, the first parameter serving for controlling a damping force in a first speed region of the vehicle, the second parameter serving for controlling the damping force in a second speed region which is a speed region higher in speed than the first speed region The contribution ratio determining step corresponds to the step 203 in which the contribution ratio determining section 120m determines the contribution ratio between the first parameter and the second parameter based on the vehicle speed Vc whose change amount has been restricted by the change amount restricting section 120l in the example of FIG. 12.

(5) A damping force controlling step of controlling a damping force of the suspension apparatus based on the determined contribution ratio and the stroke velocity The damping force controlling step corresponds to steps in which the first parameter calculating section 120e, the second parameter calculating section 120f, the difference section 120g, the multiplying section 120h, the adding section 120i, the upper/lower limit restricting section 120j and the data converting section 120k control the damping force of the suspension apparatus (suspension) based on the determined contribution ratio and the stroke velocity Vp. That is, the damping force controlling step corresponds to the steps 205 to 211 in the example of FIG. 12.

Incidentally, in the aforementioned example, the change amount of the vehicle speed is restricted and the contribution ratio is determined in the speed range of the transition region. However, it can be said that this is not essential but is a more preferable form as the method for controlling the suspension apparatus.

Incidentally, the motorcycle 1 is described as a vehicle for illustration in the aforementioned examples. However, the present invention is not limited thereto but may be also applied to a case of another vehicle such as a four-wheeler or a three-wheeler.

In addition, in the aforementioned examples, each stroke amount is acquired from the stroke sensor 30, and the stroke amount is differentiated by the calculation section 110 to thereby calculate the stroke velocity Vp. When the present invention is formed into such a form, it is possible to obtain the aforementioned effect attained by the present invention. However, the present invention is not limited to this form. The present invention may be formed into a form in which, for example, the acquisition section 120d acquires the stroke velocity Vp from the sensor which can directly measure the stroke velocity. It is possible to obtain the aforementioned effect attained by the present invention even in such a form.

The invention claimed is:

1. A control apparatus for a suspension apparatus, comprising:
   a vehicle speed acquiring section which acquires a vehicle speed as a speed of a vehicle;
   an acquisition section which acquires a stroke velocity of the suspension apparatus disposed between a vehicle body and a wheel to damp vibration propagated from the wheel;
   a contribution ratio determining section which determines a contribution ratio between a first parameter and a second parameter based on the vehicle speed, the first parameter serving for controlling a damping force in a first speed region of the vehicle, the second parameter serving for controlling the damping force in a second speed region which is a speed region higher in speed than the first speed region;
   a change amount restricting section which restricts a change amount of the contribution ratio; and
   a damping force controlling section which controls the damping force of the suspension apparatus based on the contribution ratio that was restricted by the change amount restricting section and the stroke velocity,
   wherein
   the damping force controlling section includes:
      a multiplying section which multiplies a difference between the first parameter and the second parameter by the contribution ratio to thereby obtain a multiplication value; and
      an adding section which adds the multiplication value to the first parameter to thereby calculate an addition value which is a current value determined by the stroke velocity in order to control the damping force of the suspension apparatus, and
   the damping force controlling section controls the damping force of the suspension apparatus by use of the addition value.

2. The control apparatus for a suspension apparatus according to claim 1, wherein:
   the contribution ratio determining section determines the contribution ratio in a transition region between the first speed region and the second speed region.

3. The control apparatus for a suspension apparatus according to claim 1, wherein:
   the change amount restricting section restricts the change amount of the contribution ratio when the vehicle speed decreases.

4. A suspension system comprising:
   the suspension apparatus which is disposed between the vehicle body and the wheel of the vehicle to damp vibration propagated from the wheel; and
   the control apparatus according to claim 1.

5. The suspension system according to claim 4, wherein:
   the suspension apparatus includes a stroke sensor which outputs a stroke amount of the suspension apparatus; and
   the acquisition section calculates the stroke velocity based on the stroke amount outputted by the stroke sensor.

6. A control apparatus for a suspension apparatus, comprising:
   a vehicle speed acquiring section which acquires a vehicle speed as a speed of a vehicle;

an acquisition section which acquires a stroke velocity of the suspension apparatus disposed between a vehicle body and a wheel to damp vibration propagated from the wheel;

a change amount restricting section which restricts a change amount of the vehicle speed;

a contribution ratio determining section which determines a contribution ratio between a first parameter and a second parameter based on the vehicle speed that was restricted by the change amount restricting section, the first parameter serving for controlling a damping force in a first speed region of the vehicle, the second parameter serving for controlling the damping force in a second speed region which is a speed region higher in speed than the first speed region; and a damping force controlling section which controls the damping force of the suspension apparatus based on the contribution ratio that was determined by the contribution ratio determining section and the stroke velocity, wherein the damping force controlling section includes:
- a multiplying section which multiplies a difference between the first parameter and the second parameter by the contribution ratio to thereby obtain a multiplication value; and
- an adding section which adds the multiplication value to the first parameter to thereby calculate an addition value which is a current value determined by the stroke velocity in order to control the damping force of the suspension apparatus, and the damping force controlling section controls the damping force of the suspension apparatus by use of the addition value.

7. The control apparatus for a suspension apparatus according to claim 6, wherein:
- a transition region is provided between the first speed region and the second speed region; and
- the change amount restricting section restricts the change amount of the vehicle speed in a speed range of the transition region.

8. The control apparatus for a suspension apparatus according to claim 6, wherein:
- the contribution ratio determining section determines the contribution ratio in a transition region between the first speed region and the second speed region.

9. The control apparatus for a suspension apparatus according to claim 6, wherein:
- the change amount restricting section restricts the change amount of the contribution ratio when the vehicle speed decreases.

10. A suspension system comprising:
- the suspension apparatus which is disposed between the vehicle body and the wheel of the vehicle to damp vibration propagated from the wheel; and
- the control apparatus according to claim 6.

11. The suspension system according to claim 10, wherein:
- the suspension apparatus includes a stroke sensor which outputs a stroke amount of the suspension apparatus; and
- the acquisition section calculates the stroke velocity based on the stroke amount outputted by the stroke sensor.

* * * * *